United States Patent
Kai et al.

(10) Patent No.: US 9,467,229 B2
(45) Date of Patent: Oct. 11, 2016

(54) MULTILEVEL INTENSITY MODULATION AND DEMODULATION SYSTEM AND METHOD

(71) Applicant: FUJITSU LIMITED, Kawasaki-shi, Kanagawa (JP)

(72) Inventors: Yutaka Kai, Kawasaki (JP); Masato Nishihara, Kawasaki (JP); Toshiki Tanaka, Setagaya (JP); Tomoo Takahara, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 86 days.

(21) Appl. No.: 14/602,568

(22) Filed: Jan. 22, 2015

(65) Prior Publication Data
US 2015/0222359 A1    Aug. 6, 2015

(30) Foreign Application Priority Data
Feb. 3, 2014   (JP) ................................. 2014-018913

(51) Int. Cl.
*H04B 10/00* (2013.01)
*H04B 10/2575* (2013.01)
(Continued)

(52) U.S. Cl.
CPC ........ *H04B 10/2575* (2013.01); *H04B 10/541* (2013.01); *H04L 27/36* (2013.01)

(58) Field of Classification Search
CPC . H04B 10/2575; H04B 27/36; H04B 10/541
See application file for complete search history.

(56) References Cited

U.S. PATENT DOCUMENTS

| 2003/0235415 A1* | 12/2003 | Peters | H04B 10/541 398/197 |
| 2008/0019460 A1* | 1/2008 | Giles | H04B 10/541 375/308 |
| 2013/0071122 A1* | 3/2013 | Sasaki | H04B 10/548 398/79 |

(Continued)

FOREIGN PATENT DOCUMENTS

| EP | 0998087 A1 | 5/2000 |
| JP | 10-209961 | 8/1998 |

(Continued)

OTHER PUBLICATIONS

Extended European Search Report mailed Jun. 8, 2015 in related European Application No. 15152659.7.

*Primary Examiner* — Danny Leung
(74) *Attorney, Agent, or Firm* — Staas & Halsey LLP

(57) ABSTRACT

A multilevel-intensity modulation and demodulation system includes: a digital-to-analog conversion unit to convert an output level value of a digital signal into an analog signal; a multilevel-intensity-modulated light transmission unit to transmit an optical signal multilevel-intensity modulated based on the analog signal; a multilevel-intensity-modulated light reception unit to receive the optical signal multilevel-intensity modulated, and convert the received optical signal into an analog reception electrical signal; an analog-to-digital conversion unit to convert the analog reception electrical signal into a reception level value; and a controller to convert a transmission multiple gradation level being one of a plurality of multiple gradation levels of multilevel-intensity modulation to which the digital signal is mapped, into the output level value so as to cause the reception level value to be in a desired reception state, and to receive a digital signal corresponding to a reception multiple-gradation-level determined from the reception level value.

12 Claims, 20 Drawing Sheets

(51) Int. Cl.
   *H04B 10/54*   (2013.01)
   *H04L 27/36*   (2006.01)

(56) References Cited

U.S. PATENT DOCUMENTS

2014/0348515 A1\* 11/2014 Tsubouchi ........... H04B 10/613
                                                            398/202

2015/0222359 A1\* 8/2015 Kai ................... H04B 10/2575
                                                            398/115

FOREIGN PATENT DOCUMENTS

| JP | 2008-113386 | 5/2008 |
| WO | 2011/106626 A2 | 9/2011 |

\* cited by examiner

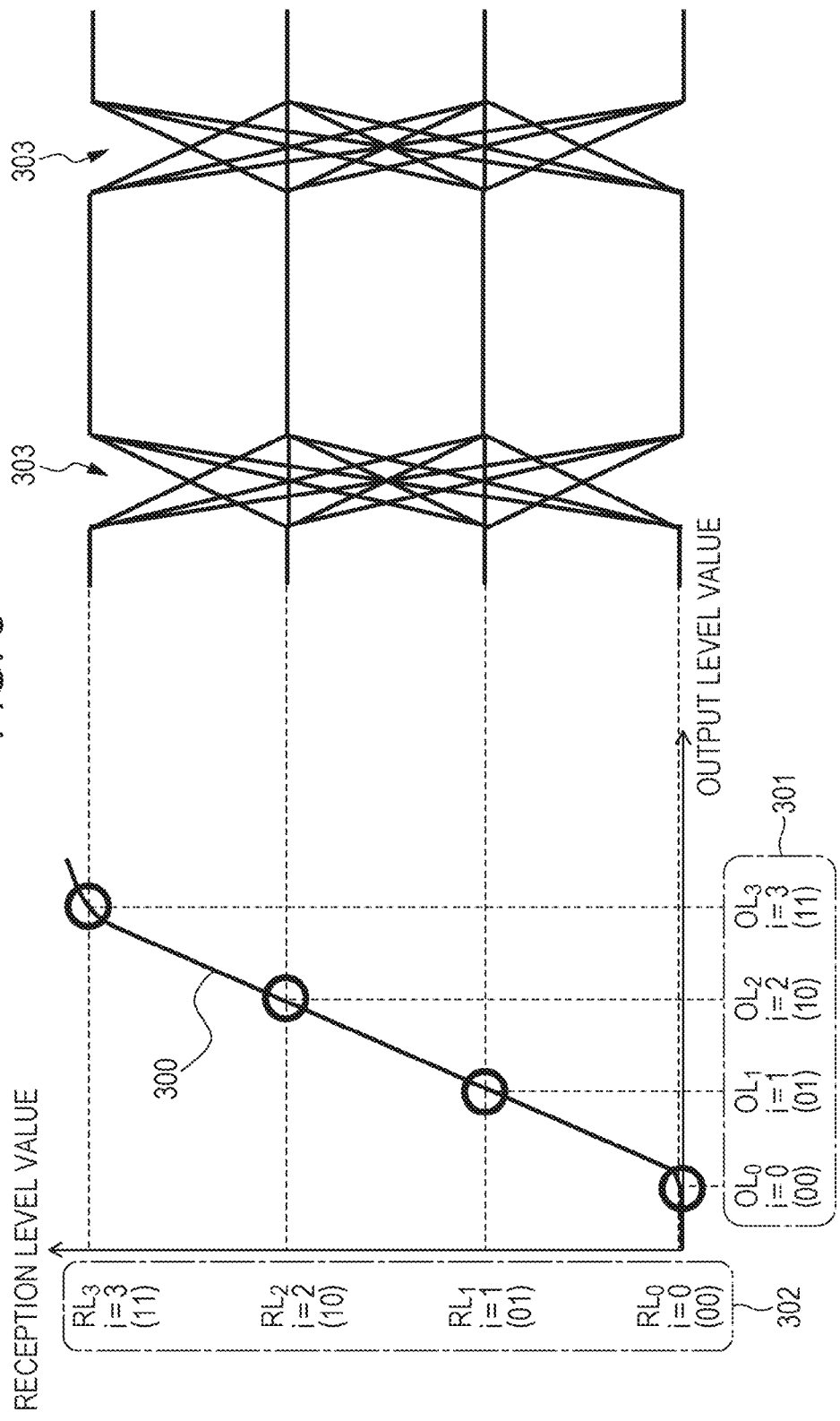

FIG. 15

| MULTIPLE GRADATION LEVEL i | RECEPTION LEVEL VALUE level | OUTPUT LEVEL VALUE DACSET_level_i |
|---|---|---|
| 0 | 23 (INITIAL VALUE 23) | 14 |
| 1 | 53 (23+30×1) | 24 |
| 2 | 83 (23+30×2) | 49 |
| 3 | 113 (23+30×3) | 78 |
| 4 | 143 (23+30×4) | 110 |
| 5 | 173 (23+30×5) | 149 |
| 6 | 203 (23+30×6) | 192 |
| 7 | 233 (23+30×7) | 238 |

FIG. 20

| MULTIPLE GRADATION LEVEL i | RECEPTION LEVEL VALUE | GRADATION DIFFERENCE (SNR) OF MULTIPLE GRADATION LEVEL | OUTPUT LEVEL VALUE DACSET_level_i |
|---|---|---|---|
| 0 | L0 | \|L1 − L0\| | ADJUST OUTPUT LEVEL VALUE SO THAT ALL "DIFFERENCES BETWEEN GRADATIONS IN MULTIPLE LEVELS" ARE EQUAL |
| 1 | L1 | \|L2 − L1\| | |
| 2 | L2 | \|L3 − L2\| | |
| 3 | L3 | \|L4 − L3\| | |
| 4 | L4 | \|L5 − L4\| | |
| 5 | L5 | \|L6 − L5\| | |
| 6 | L6 | \|L7 − L6\| | |
| 7 | L7 | — | |

MULTILEVEL INTENSITY MODULATION AND DEMODULATION SYSTEM AND METHOD

CROSS-REFERENCE TO RELATED APPLICATION

This application is based upon and claims the benefit of priority of the prior Japanese Patent Application No. 2014-018913, filed on Feb. 3, 2014, the entire contents of which are incorporated herein by reference.

FIELD

The embodiments discussed herein are related to multilevel intensity modulation and demodulation systems and methods that perform communication using multilevel intensity-modulated signals.

BACKGROUND

Recent growing demand for transmission capacity has led to a demand for faster communication systems. In a network area close to end users, such as an access network, broadband transmission having a communication speed exceeding 100 gigabits per second is expected. However, as the baud rate rises, faster response speeds of optical devices and electronic device used for transmission are demanded. The faster the operation speeds of devices are, the higher the prices of devices are.

To address this issue, modulation methods such as pulse amplitude modulation (PAM) and quadrature amplitude modulation (QAM) in which the intensity of a signal to be transmitted is varied in order to achieve multilevel intensity modulation have attracted much attention as signal multiplex transmission techniques. Particularly, PAM uses only intensity information, and consequently multilevel intensity modulation is simply realized merely by varying the signal amplitude. By using PAM, a high bit rate may be achieved relatively simply. For this reason, PAM has attracted more attention. Instead of communication in a binary form only using 0 and 1, communication with multilevel modulation by using a modulation method such as PAM enables a decrease in baud rate. As a result, a low-cost, high bit-rate communication system may be implemented using optical devices and electronic devices having low frequency response characteristics.

However, in PAM, since multilevel symbols are assigned to portions where communication has been performed in a binary form using 0 and 1, the distance between symbols is decreased. This results in degradation in signal-to-noise ratio (SNR). Moreover, in order to obtain uniform transmission characteristics for any multilevel symbol, intermediate levels between the level "0" (OFF) and the level "1" (ON) are important. In the case of the level "0", a signal of the level "0" is generated by turning off the signal source, and thus the level "0" is sometimes represented as "OFF". In the case of the level "1", a signal of the level "1" is generated by turning on the signal source, and thus the level "1" is sometimes represented as "ON". In the case of multilevel intensity-modulated signals as in PAM, optical devices and electronic devices that operate linearly are to be used for not only two levels, 0 and 1, but also the entirety of levels therebetween. In binary transmission methods, only whether the level is 0 or 1 is important, and accuracy in intermediate output levels is not important. If light output does not linearly vary with respect to voltage, this nonlinearity has no influence on the transmission characteristics. However, in the case where optical devices and electronic devices that have been used for communication in a binary form using 0 and 1 are used for multilevel intensity modulation, the intermediate output levels do not vary linearly, which results in degradation in characteristics.

In other words, multilevel intensity modulation has to use the dedicated optical and electrical devices capable of performing linear operations. For this reason, there is a problem in that multilevel intensity modulation is expensive.

To address such a problem, the following related art example is known, for example, Japanese Laid-open Patent Publication No. 10-209961. A signal that is distorted in advance by passing through a nonlinear circuit is inputted to an optical modulator, and thus an increase in each optical power level of a multilevel optical signal transmitted from an optical transmitter is set such that the increase grows monotonously. This alleviates the influence of added noise so as to improve the reception sensitivity.

The following another related art example is known, for example, Japanese Laid-open Patent Publication No. 2008-113386. An optical transmitter includes a data transmission unit that outputs transmission data and a multilevel setting unit that sets the multiple level of an optical signal. The optical transmitter further includes a driving unit that converts an output of the data transmission unit into a multilevel amplitude signal based on an output of the multilevel setting unit, and a light emitting unit that converts an output signal of the driving unit into an optical signal. An optical receiver includes a light reception unit that receives an optical signal from the light emitting unit, a first extinction ratio detector that detects the extinction ratio of an optical signal from an output signal of the light reception unit, and an identification level setting unit that sets an identification level for determining the multilevel of an output signal from the light reception unit based on an output from the extinction ratio detector. The optical receiver further includes a multilevel determination unit that determines the multiple level of an output signal from the light reception unit based on an output of the identification level setting unit. This related art example provides the optical transmitter, the optical receiver, and an optical transmission system in which a multilevel amplitude-modulated optical signal with the SNR being equal among multiple levels is obtained by detecting the extinction ratio of a multilevel optical signal outputted from the optical transmitter and setting a multiple level.

SUMMARY

According to an aspect of the invention, a multilevel intensity modulation and demodulation system includes: a digital-to-analog conversion unit configured to convert an output level value of a digital signal to be transmitted into an analog transmission electrical signal; a multilevel intensity-modulated light transmission unit configured to transmit, to an optical transmission system, an optical signal that is multilevel intensity modulated based on the analog transmission electrical signal; a multilevel intensity-modulated light reception unit configured to receive, from the optical transmission system, the optical signal that is multilevel intensity modulated, and convert the received optical signal into an analog reception electrical signal; an analog-to-digital conversion unit configured to convert the analog reception electrical signal into a reception level value; and a controller configured to convert a transmission multiple gradation level, the transmission multiple gradation level being one of a plurality of multiple gradation levels of multilevel intensity modulation to which the digital signal to be transmitted is mapped, into the output level value so as to cause the reception level value to be in a desired reception state, and to receive a digital signal corresponding to a reception multiple gradation level determined from the reception level value.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of a quaternary multilevel intensity modulation;

FIG. 15 is a table illustrating an example of operations of the DAC-value search process;

FIG. 20 is a table depicting an example of operations of the mapping process using SNRs.

DESCRIPTION OF EMBODIMENTS

In a multilevel intensity modulation system in which determinations for intermediate output levels between 0 (OFF) and 1 (ON) have to be made, various optical devices and electronic devices in the system are factors for breaking the linearity of intermediate output levels. The nonlinearity of intermediate output levels due to these devices may change depending on the system.

Unfortunately, with the relate art example in which an optical transmitter transmits an optical signal set in such a manner that an increase in each optical power level grows monotonously, it is difficult to satisfactorily handle the nonlinearity of intermediate output levels that may change variously depending on the system.

In addition, in the related art example in which the extinction ratio of a multilevel optical signal outputted from an optical transmitter is detected and the multiple level is set, the intervals between multiple levels of a signal to be multilevel amplitude modulated are varied in accordance with the extinction ratio, so that the signal-to-noise ratios (SNRs) of multiple levels are equal. However, the extinction ratio is detected only based on the characteristics of the optical transmitter. As a result, it is difficult to handle the nonlinearity due to various optical devices and electronic devices in the entire system including an optical transmission system and an optical receiver.

Hereinafter, embodiments of the present disclosure that may provide a multilevel intensity modulation and demodulation system and method capable of compensating for the nonlinearity of intermediate output levels due to various devices in the system will be described in detail with reference to the accompanying drawings.

First Embodiment

Figure 1:
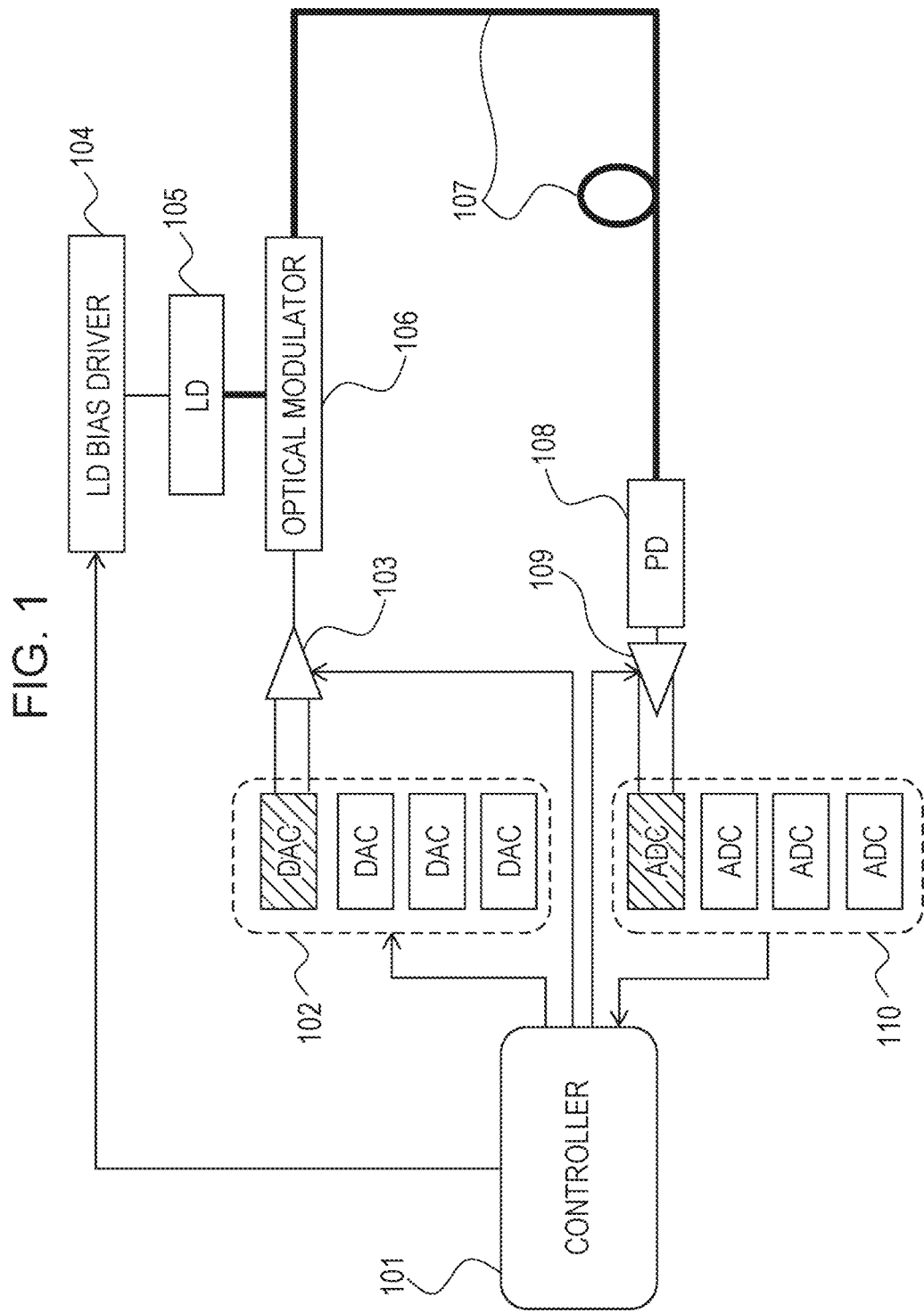
FIG. 1 is a diagram illustrating a configuration example of a multilevel intensity modulation system according to embodiments.

FIG. 1 is a diagram illustrating a configuration example of a multilevel intensity modulation system according to embodiments of the present disclosure. This system has a configuration on the transmitter side as follows. First, a digital-to-analog converter (DAC) group 102, which is a digital-to-analog conversion unit, is composed of DACs, for example, of four channels. Each DAC converts an output level value, which is a binary digital signal of each channel outputted from a controller 101 described below, into a respective analog transmission electrical signal.

The DAC output of each channel outputted from each DAC of the DAC group 102 is inputted to a modulation-signal driver amplifier 103.

FIG. 1 illustrates that the modulation-signal driver amplifier 103 is coupled only to the output of the DAC indicated by hatching in the DAC group 102. In reality, however, modulation-signal driver amplifiers are coupled to the outputs of the other three DACs, respectively.

The modulation-signal driver amplifier 103 operates as a drive circuit that adjusts the output level of an analog transmission electrical signal outputted from a DAC to a level at which an optical modulator 106 at a stage thereafter is driven. Note that this drive circuit may be provided separately from the modulation-signal driver amplifier 103, or does not have to be independently provided if the output of the DAC is at a sufficient level.

Additionally, when the controller 101 performs an initialization (optimization) process of optical and electrical components described below, the modulation-signal driver amplifier 103 adjusts the gain of an analog transmission electrical signal outputted from the DAC to an optimal value according to settings from the controller 101.

The output of the modulation-signal driver amplifier 103 is inputted to the optical modulator 106. The optical modulator 106, a laser diode (LD) 105, which is a laser diode light source, and an LD bias driver 104, which is a bias driver circuit that drives the LD 105, together form a multilevel intensity-modulated light transmission unit.

The multilevel intensity-modulated light transmission unit transmits an optical signal that is multilevel intensity modulated based on an analog transmission electrical signal outputted from the modulation-signal driver amplifier 103, to an optical fiber 107 included in an optical transmission system.

More specifically, during the initialization (optimization) process of optical and electrical components with the controller 101, the LD bias driver 104 performs the following operations. The LD bias driver 104 adds an optimal bias to the LD 105 based on an LD bias adjustment signal from the controller 101.

The LD 105 generates continuous-wave (CW) light.

Based on an analog transmission electrical signal outputted from the modulation-signal driver amplifier 103, the optical modulator 106 provides light intensity modulation on the CW light generated by the LD 105, and thus outputs a multilevel intensity-modulated optical signal to the optical fiber 107 included in the optical transmission system.

In FIG. 1, one multilevel intensity-modulated light transmission unit composed of the LD bias driver 104, the LD 105, and the optical modulator 106 is represented so as to correspond to the output of a DAC indicated by hatching in the DAC group 102 and the modulation-signal driver amplifier 103 coupled thereto. In reality, the multilevel intensity-modulated light transmission units are coupled so as to correspond to the outputs of the other three DACs and the modulation-signal driver amplifiers 103 coupled thereto, respectively. The outputs of the four optical modulators 106 corresponding to four channels are optically multiplexed onto one optical fiber 107.

The optical fiber 107 forms an optical transmission system. Various optical devices may be coupled to this optical transmission system. Examples of optical devices include an optical amplifier, a variable optical attenuator (VOA), and a variable dispersion compensator (VDC). Other examples thereof include an optical switch, a multiplexer (MAX), a demultiplexer (DMAX), an optical demultiplexer, and an optical multiplexer. During the initialization (optimization) process of optical and electrical components described below and the uneven mapping process described below performed by the controller 101 described below, an actual optical transmission system or an optical transmission system that simulates the actual optical transmission system may be coupled. Further, optical signals transmitted from the optical modulator 106 to the optical transmission system may be transmitted in a loop through this optical transmission system and returned to a receiver described below.

Next, the multilevel intensity modulation system of FIG. 1 has the following configuration, which is a receiver-side configuration. First, a photo diode (PD) 108, which is a multilevel intensity-modulated light reception unit, receives a multilevel intensity-modulated optical signal from the optical fiber 107 included in the optical transmission system, and converts the received, multilevel intensity-modulated optical signal into an analog reception electrical signal.

The output of the PD 108 is inputted to a reception preamplifier 109. This reception preamplifier 109 is, for example, a trans-impedance amplifier (TIA). During the initialization (optimization) process of optical and electrical components performed by the controller 101, the reception preamplifier 109 adjusts the gain of the analog reception electrical signal to an optimal value in accordance with a setting from the controller 101.

The output of the reception preamplifier 109 is inputted to one analog-to-digital converter (ADC) in an ADC group 110, which is an analog-to-digital conversion unit. The ADC group 110 is composed of, for example, four channel ADCs.

In FIG. 1, the PD 108 and the reception amplifier 109 described above are illustrated to be coupled to the ADC indicated by hatching within the ADC group 110. In reality, however, the PD 108 and the reception preamplifier 109 are coupled to each of the inputs of the other three ADCs.

Each ADC in the ADC group 110 converts the received analog electrical signal inputted from the reception preamplifier 109 into a reception level value, which is a digital signal.

Each reception level value outputted from each ADC in the ADC group 110 is inputted to the controller 101.

The controller 101 is provided with a control function for the transmitter side and a control function for the receiver side. As the control function for the transmitter side, the controller 101 converts a digital signal, which is to be transmitted, into a multiple gradation level as a transmission multiple gradation level, and further generates an output level value corresponding to the transmission multiple gradation level to each of the four channels. The output level values generated of channels are inputted to the DACs in the DAC group 102.

As the control function for the receiver side, the controller 101 determines which of multiple gradation levels the reception level value outputted from each ADC in the ADC group 110 corresponds to, and outputs a reception multiple gradation level, which is the determined multiple degradation level, to that channel of the four channels. Then, the controller 101 receives a digital signal corresponding to the reception multiple gradation level.

Figure 2:
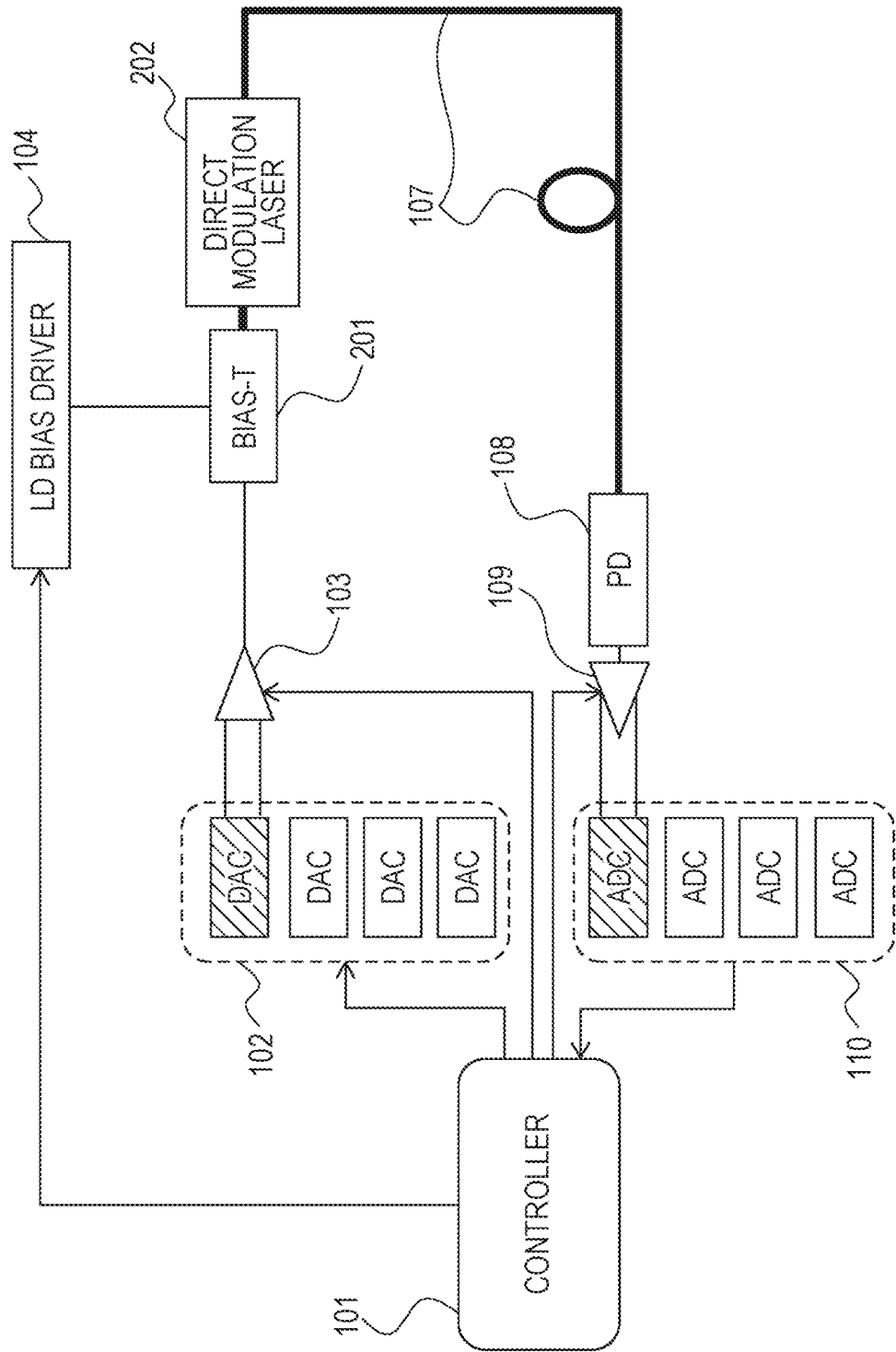
FIG. 2 is a diagram illustrating another configuration example of a multilevel intensity modulation system according to the embodiments.

FIG. 2 is a diagram illustrating another configuration example of a multilevel intensity modulation system according to the embodiments of the present disclosure. Components that perform the same operations as in the configuration example of FIG. 1 are denoted by the same reference numerals. Components in the configuration of FIG. 2 different from those in the configuration of FIG. 1 are, in the transmitter-side configuration, a bias supply circuit (bias-T) and a direct modulation laser 202, which are provided in place of the LD 105 and the optical modulator 106 of FIG. 1.

With the configuration of FIG. 2, during the initialization (optimization) process of optical and electrical components performed by the controller 101 described below, the LD bias driver 104 performs the following operations. The LD bias driver 104 adds an optimal bias (DC component) to an analog transmission electrical signal outputted by the modulation-signal driver amplifier 103 based on an LD bias adjustment signal from the controller 101.

Further, based on the analog transmission electrical signal subjected to the above-mentioned bias control, the direct modulation laser 202 outputs, to the optical fiber 107 as the optical transmission system, a multilevel intensity-modulated optical signal that is light intensity modulated.

The operations of the multilevel intensity modulation system having the configuration of FIG. 1 or the configuration of FIG. 2 described above will be described in detail below.

General operations and problems of the multilevel intensity modulation system are first described, and then detailed operations of this embodiment are described.

FIG. 3 is a diagram illustrating an example of a quaternary multilevel intensity modulation (for one channel). On the transmitter side, as denoted by 301 of FIG. 3, first, the controller 101 divides a digital signal, which is inputted and to be transmitted, into 2-bit symbol sequences. The controller 101 then converts symbol sequences "00", "01", "10", and "11" into transmission multiple gradation levels i=0, 1, 2, and 3, respectively. The controller 101 further converts the transmission multiple gradation levels i=0, 1, 2, and 3 into an output level value of four levels $OL_0$, $OL_1$, $OL_2$, and $OL_3$, which are input values to one DAC in the DAC group 102. This output level value is determined in accordance with the resolution of the DAC. In the case of a DAC of 8 bits, for example, the output level value is any of values in a range from 0 to 255 in a decimal system. In reality, the output level value is inputted as binary data that may have a value, for example, in a range from 00000000 to 11111111 to the DAC. The DAC converts each output level value into an analog transmission electrical signal. Based on this analog transmission electrical signal, the optical modulator 106 in FIG. 1 or the direct modulation laser 202 in FIG. 2 outputs a multilevel intensity-modulated optical signal.

In such a way, the multilevel intensity modulation enables a plurality of symbols, for example, 2-bit symbols in the case of quaternary intensity modulation to be assigned to each output level value for, for example, an 8-bit binary code. As a result, for example, in the case of quaternary intensity modulation, transmission of 20 gigabits per second (Gbps) is possible with a waveform of 10 Gbps.

On the receiver side, as denoted by 302 of FIG. 3, first, the PD 108 receives a multilevel intensity-modulated optical signal from the optical system including the optical fiber 107, and converts the received optical signal into an analog reception electrical signal. Next, one ADC in the ADC group 110 converts the analog reception electrical signal inputted through the reception preamplifier 109 into a reception level value for, for example, an 8-bit binary code. The controller 101 determines which of four reception level values $RL_0$, $RL_1$, $RL_2$, and $RL_3$ the reception level value for, for example, an 8-bit binary code outputted by the ADC is closest to. The controller 101 outputs one of the reception multiple gradation levels i=0, 1, 2, and 3 corresponding to the determined one of the reception level values $RL_0$, $RL_1$, $RL_2$, and $RL_3$, respectively. Then, the controller 101 demodulates and outputs, as a received digital signal, one of symbol sequences "00", "01", "10", and "11" corresponding to the outputted one of the reception multiple gradation levels i=0, 1, 2, and 3, respectively.

Here, optical devices and analog electronic devices along a communication path from the DAC group 102 on the transmitter side to the ADC group 110 on the receiver side are assumed to have linearity in input-output characteristics.

In this case, over the entire communication path, output level values $OL_0$, $OL_1$, $OL_2$, and $OL_3$ for, for example, 8-bit binary codes are mapped at uniform intervals for the transmission multiple gradation levels i=0, 1, 2, and 3 on the transmitter side. For this regard, through conversions denoted by circles on the linear characteristics of the entire communication path denoted by 300 of FIG. 3, the reception level values $RL_0$, $RL_1$, $RL_2$, and $RL_3$ for, for example, 8-bit binary codes mapped for the reception multiple gradation levels i=0, 1, 2, and 3 on the receiver side are at uniform intervals.

In this case, eye openings of waveforms of multi-level intensity modulated optical signals transmitted through the optical transmission system have clear openings as denoted by 303 of FIG. 3.

In this way, when, while the output level values $OL_0$, $OL_1$, $OL_2$ and $OL_3$ for, for example, 8-bit binary codes are outputted on the transmitter side, determinations among the reception level values $RL_0$, $RL_1$, $RL_2$ and $RL_3$ for, for example, 8-bit binary codes are made at uniform intervals on the receiver side, it is possible to realize optimal multilevel intensity modulation.

In practice, however, devices that do not have linear input-output characteristics are used as the above-described optical devices and electronic devices along the communication path.

Figure 4A:
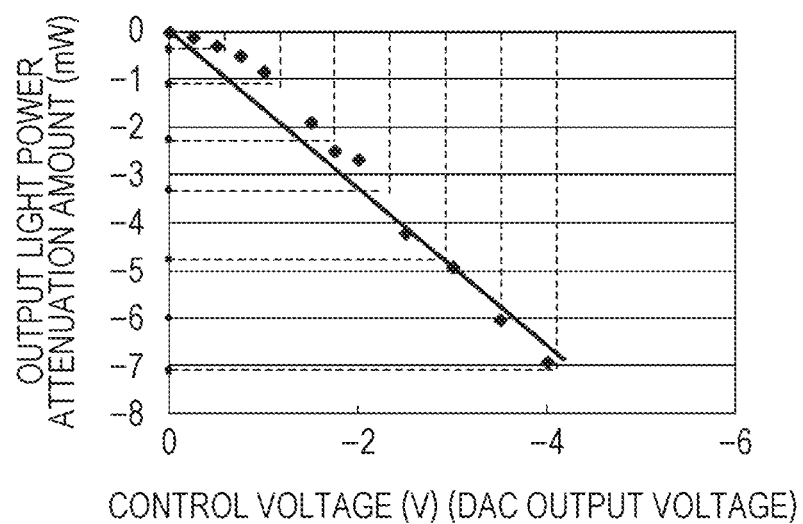
FIG. 4A is and FIG. 4B are graphs depicting an example of characteristics of the control voltage versus the output light power attenuation amount of an electro-absorption (EA) modulator for NRZ signals in a binary form using 0 and 1, and depicting an example of characteristics of the current versus the output light power of a direct modulation laser.
Figure 4B:
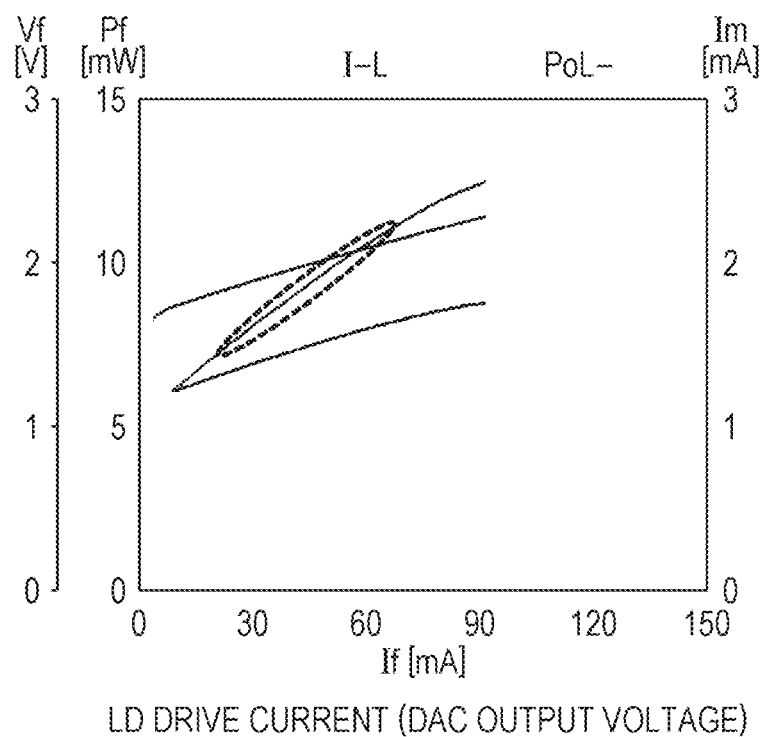

FIG. 4A is a graph depicting an example of characteristics of the control voltage versus the output light power attenuation amount of an electro-absorption (EA) modulator for non-return-to-zero (NRZ) signals in a binary form using 0 and 1. The EA modulator may be used as the optical modulator 106 of FIG. 1. FIG. 4B is a graph depicting an example of characteristics of the current versus the output light power of a typical direct modulation laser (DML), which may be used as the direct modulation laser 202 of FIG. 1.

Usually, a control circuit controls output power by controlling a control voltage of the EA modulator or a drive current of the DML and, as a result, the ON state and the OFF state are produced. Thus, by making use of a difference in light intensity, it becomes possible to use binary intensity modulation. In reality, however, as indicated by plots "♦" of FIG. 4A or by a portion surrounded by a dotted-line ellipse of FIG. 4B, the ratio of variations in output light power relative to the control voltage or the LD drive current forms a curve, not a straight line. Consequently, in the case where, with respect to the horizontal axis, modulation is performed under the condition that 8-bit output level values inputted to each DAC in the DAC group 102 of FIG. 1 are evenly assigned to transmission multilevel values, the output light power represented by the vertical axis does not vary linearly. In other words, the interval between symbols is sometimes narrow and sometimes wide. As a result, the difference in multiple levels causes a difference in transmission characteristics.

Figure 5A:
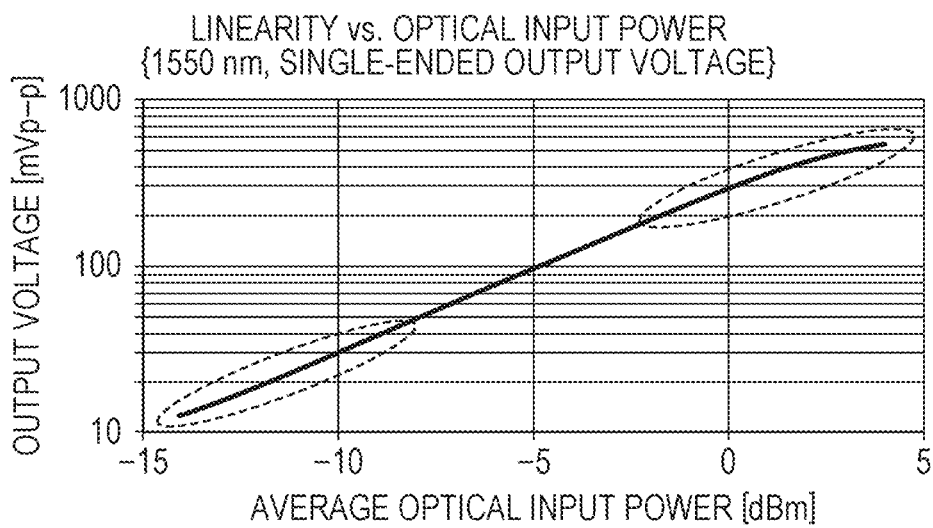
FIG. 5A and FIG. 5B are graphs depicting examples of the characteristics of the optical power versus the output voltage of a PD.
Figure 5B:
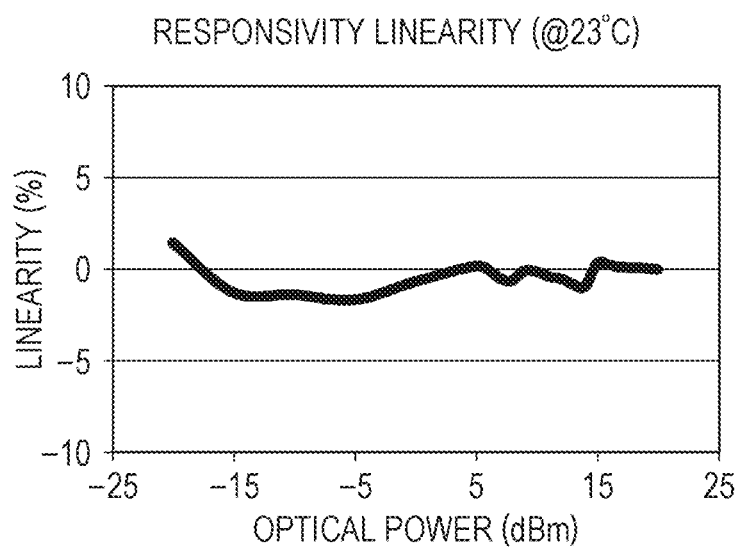

Similarly, nonlinearity is also present in the PD 108 of FIG. 1 or FIG. 2, which is a multilevel intensity-modulated light reception unit. FIG. 5A and FIG. 5B are graphs depicting examples of the characteristics of a PD placed on the market. Note that, in FIG. 5A, the horizontal axis is on a logarithmic scale in dBm, and thus the vertical axis is also on a logarithmic scale. The input-output characteristics of a PD may be linear with respect to optical power inputted. In reality, however, some PD exhibits characteristics in which the output voltage is saturated in a portion where the inputted optical power is weak or in a portion where the inputted optical power is strong, or some PD has curved characteristics, instead of straight-line characteristics. Even a PD having a relatively high linearity has dependences on the level of reception light, a dark current, a bias voltage, temperature, and so on. The output voltage of the PD is not linear. That is, even if ideal optical signals mapped linearly are received, it is difficult to keep fixed the SNR between multiple levels of multilevel intensity modulation signals in the PD 108 of FIG. 1 or FIG. 2.

Figure 6A:
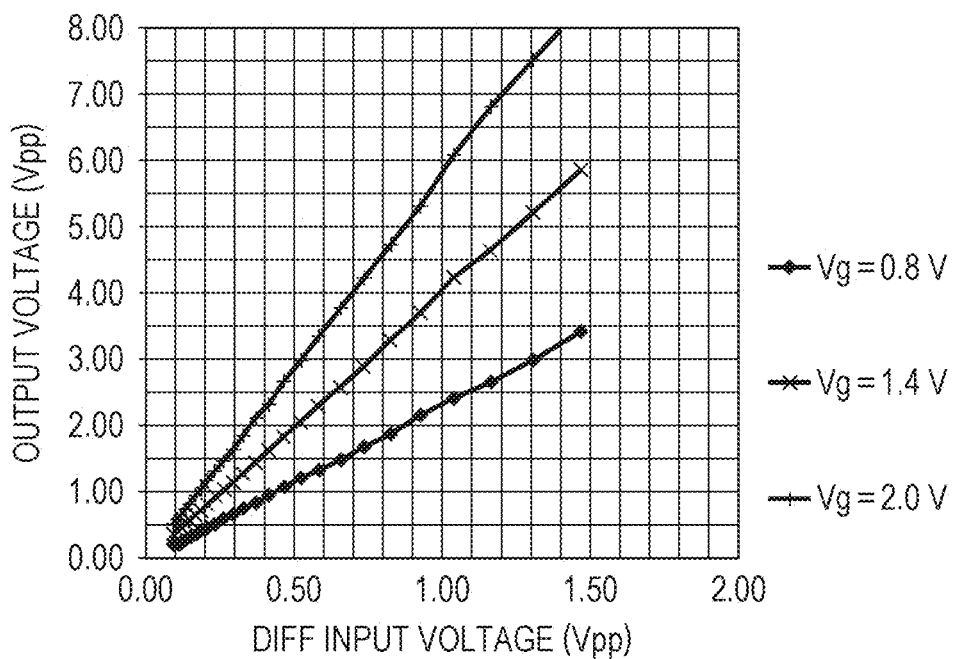
FIG. 6A and FIG. 6B are graphs depicting an example of characteristics of the input voltage versus the output voltage of a modulation signal driver amplifier and an example of characteristics of the input voltage versus the total harmonic distortion of a reception preamplifier.
Figure 6B:
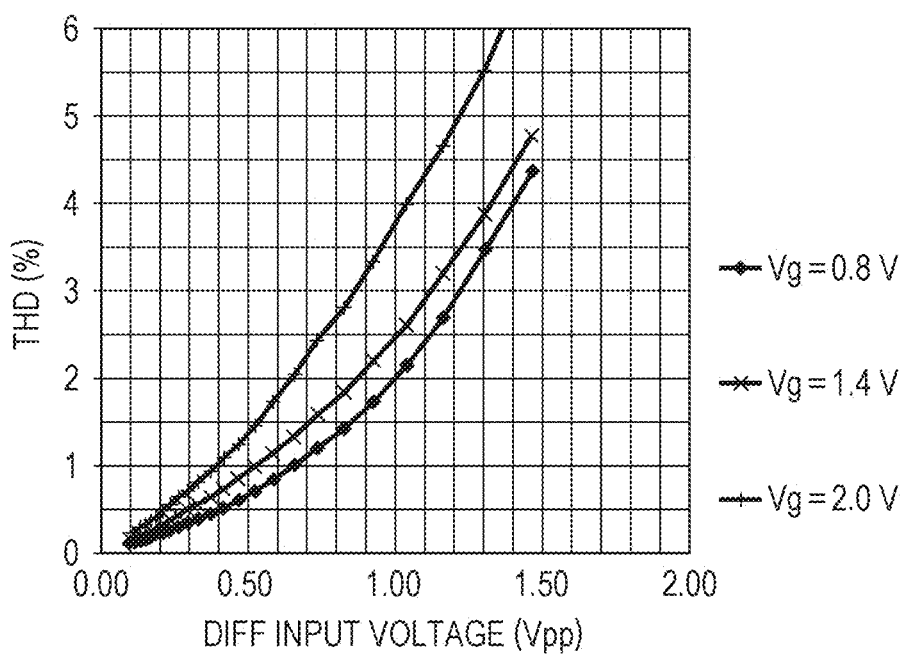

Further, in the modulation-signal driver amplifier 103 and the reception preamplifier 109 of FIG. 1 or FIG. 2, it is also difficult to maintain complete linearity of the output voltage with respect to the input voltage. FIG. 6A is a graph depicting an example of characteristics of the input voltage versus the output voltage of an electronic device that may be used for the modulation-signal driver amplifier 103. FIG. 6B is a graph depicting an example of characteristics of the input voltage versus the total harmonic distortion of an electronic device that may be used for the reception preamplifier 109. As seen from these figures, there is an area where the input-output characteristics are curved depending on variations in the input voltage (for example, characteristics of Vg=0.8 V or Vg=2.0 V). With a driver amplifier having a relatively high linearity, nonlinearity having a dependence on the input signal frequency, input voltage, or gain is exhibited, and the output contains a harmonic distortion component and thus becomes nonlinear. In addition, nonlinearity is present in the optical communication path itself including the optical fiber 107.

The linearity in the entire reception light intensity, which is not so problematic for binary intensity modulation such as none return zero (NRZ) and return zero (RZ), is important for cases of multilevel intensity modulation as described above.

Figure 7:
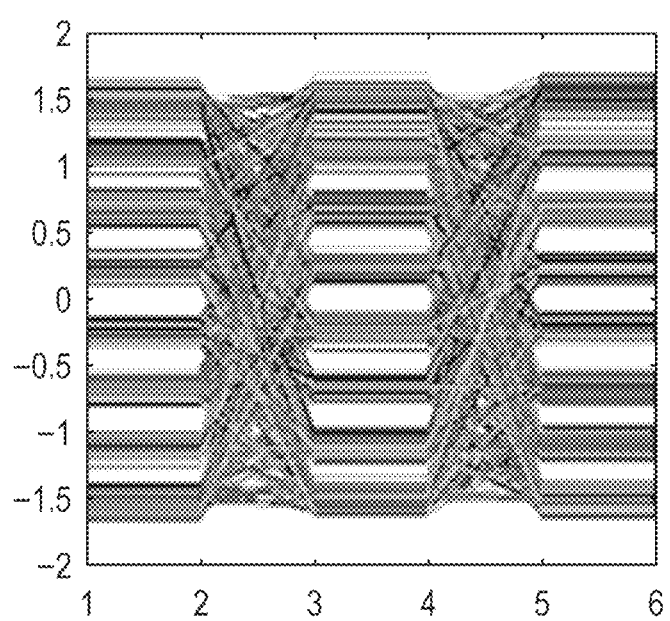
FIG. 7 is a graph depicting an example of characteristics of eye openings in the case of the absence of nonlinearity compensation.

If compensation actions are not performed for the nonlinearity of input-output characteristics of optical devices and electronic devices, the linearity of intermediate levels between 0 and 1 is not maintained and broken because of mixture of nonlinear characteristics of optical devices and electronic devices provided along the communication path from the transmitter side to the receiver side. When multilevel intensity modulation is performed under the condition where the linear relationship is broken, eye openings of optical signal waveforms observed as the reception level value of 8 bits outputted by the ADC group 110 include portions where the eye opens and portions where the eye is closed in a mixed manner as in FIG. 7. As a result, in conversion from an 8-bit reception level value to, for example, a quaternary transmission multiple gradation level value, it is impossible to make determinations at uniform intervals. This, in turn, makes it impossible to secure uniform transmission characteristics among symbols.

Figure 8A:
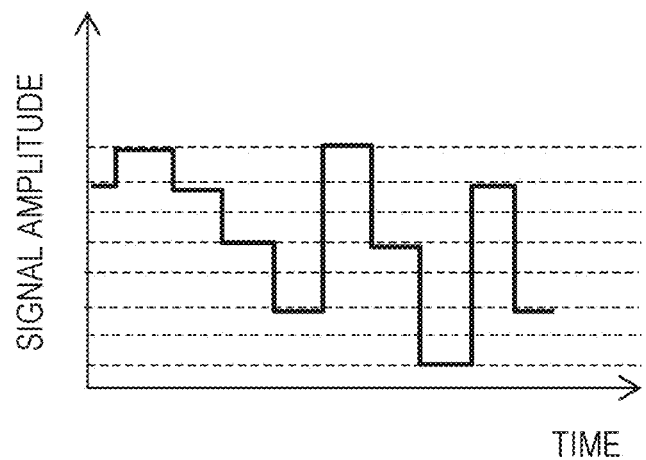
FIG. 8A and FIG. 8B are graphs depicting a transmitted modulation signal and a received modulation signal in the case of the absence of nonlinearity compensation.
Figure 8B:
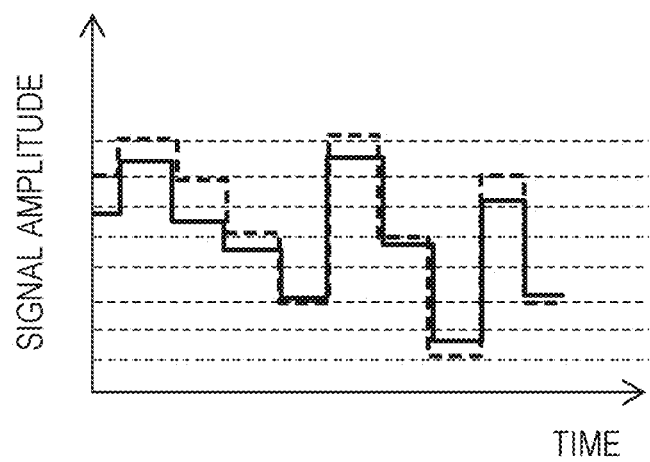

As a result, in contrast with a modulation signal transmitted on the transmitter side as depicted, for example, in FIG. 8A, a modulation signal received on the receiver side does not have an expected waveform that is the same as that of FIG. 8A and that is indicated as a dotted-line line waveform but is distorted as depicted as a solid-line waveform of FIG. 8B. This results in degradation in bit error rate (BER) or signal-to-noise ratio (SNR) of the system.

To address this, in embodiments described below, the controller 101 performs operations of compensating for nonlinear characteristics of the intermediate output level due to optical devices and electronic devices provided along the communication path from the transmitter side to the receiver side.

For this reason, the controller 101 includes, as a function of the transmitter side, a multilevel setting unit that sets an output level value for each of multiple gradation levels of multilevel intensity modulation. The controller 101 also includes the following data transmission unit. The data transmission unit converts a digital signal, which is to be transmitted, into a 2-bit (quaternary) or 3-bit (octal) transmission multiple gradation level, refers to the multilevel setting unit and generates an output level value for, for example, an 8-bit binary code corresponding to the transmission multiple gradation level, and outputs the output level value to the DAC group 102.

The controller 101 also includes, as a function of the receiver side, an output level value update unit that updates an output level value for each of multiple gradation levels set by the multilevel setting unit so that the reception level value for, for example, an 8-bit binary code outputted by the ADC group 110 is in a desired reception state.

Figure 9:
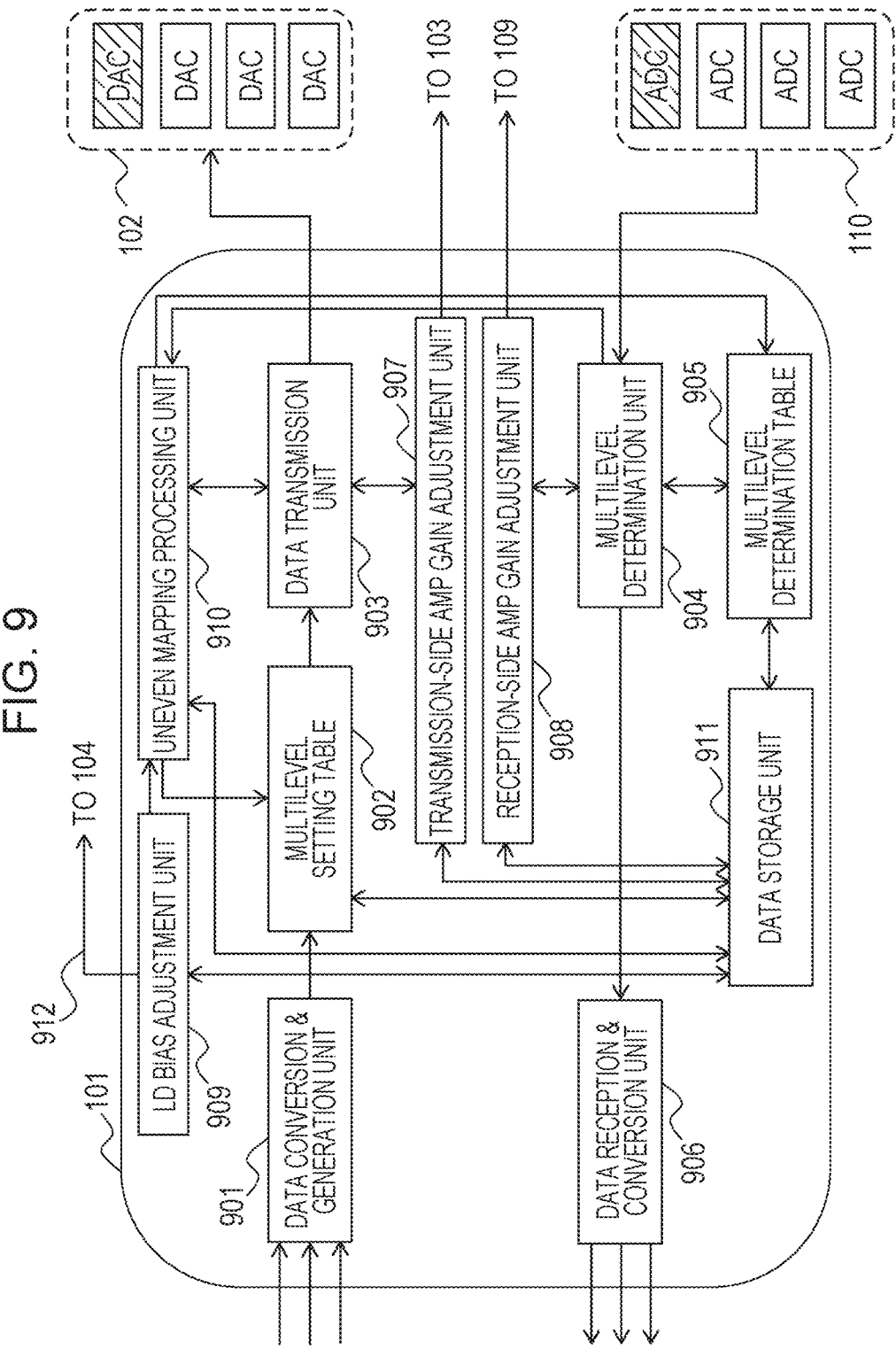
FIG. 9 is a block diagram illustrating an example of a configuration of a controller according to a first embodiment.

FIG. 9 is a block diagram illustrating an example of a configuration of the controller 101 according to the first embodiment for implementing the above-described functions of the controller 101.

A data conversion & generation unit 901, as a data conversion unit, generates the transmission multiple gradation level i, which is one of a plurality of multiple gradation levels of multilevel intensity modulation, by dividing a digital signal to be transmitted, for example, into 2-bit or 3-bit blocks and converting each of the blocks into the transmission multiple gradation level i.

In a multiple level setting table 902, as a multilevel setting unit, output level values for, for example, 8-bit binary codes are set for every multiple gradation level, for example, of two bits or three bits.

A data transmission unit 903 refers to the multiple level setting table 902 and generates output level values for, for example, 8-bit binary codes corresponding to transmission multiple gradation levels, for example, of two bits or three bits generated by the data conversion & generation unit 901.

A multilevel determination unit 904 determines which of binary (4 levels) or ternary (8 levels) multiple gradation levels, for example, the reception level value RL for, for example, an 8-bit binary code outputted by an ADC in the ADC group 110 corresponds to, and outputs the reception multiple gradation level i, for example, of two bits or three bits. At that point, the multilevel determination unit 904 makes the above determination according to a threshold for every multiple gradation level stored in a multilevel determination table 905.

A data reception & conversion unit 906, as a data reception unit, performs conversion to symbol sequences of, for example, two bits or three bits corresponding to the reception multiple gradation level i outputted by the multilevel determination unit 904, and outputs the symbol sequences as demodulated digital signals.

An uneven mapping processing unit 910, as an output level value update unit, updates an output level value for each multiple gradation level as a transmission multiple gradation level, set in the multilevel setting table 902 so that the intervals in the reception level value between adjacent symbols of the reception multiple gradation level are uniform. At that point, the uneven mapping processing unit 910 controls the data transmission unit 903, and refers to the multilevel determination unit 904 and updates the setting content of the multilevel determination table 905.

A transmission-side amp gain adjustment unit 907 controls the modulation-signal driver amplifier 103 of FIG. 1 or FIG. 2 to adjust the gain of an analog transmission electrical signal outputted from a DAC to an optimal value, during the initialization (optimization) process of optical and electrical components described below.

Similarly, a reception-side amp gain adjustment unit 908 controls the reception preamplifier 109 of FIG. 1 or FIG. 2 to adjust the gain of an analog reception electrical signal outputted from the PD 108 to an optimal value, during the initialization (optimization) process of optical and electrical components described below.

An LD bias adjustment unit 909 supplies an LD bias adjustment signal 912 to the LD bias driver 104 of FIG. 1 or FIG. 2. During the initialization (optimization) process of optical and electrical components described below, an optimal bias is added from the LD bias driver 104 to the LD 105 (in the case of FIG. 1) or the bias-T 201 (in the case of FIG. 2) by the LD bias adjustment signal 912.

A data storage unit 911 supplies the initial values of various setting parameters, and the like, to the multilevel determination table 905, the uneven mapping processing unit 910, the transmission-side amp gain adjustment unit 907, the reception-side amp gain adjustment unit 908, and the LD bias adjustment unit 909.

The controller 101 having the configuration of FIG. 9 is mounted on, for example, a digital signal processor (DSP). In this case, the function units denoted by 901, 903, 904, and 906 to 910 are operations performed when a processor of a DSP reads and executes control programs of, for example, firmware stored in a read-only memory (ROM) in the DSP into a random access memory (RAM) in the DSP. Additionally, the tables denoted by 902 and 905 and the storage unit denoted by 911 are formed in the RAM or the ROM in the DSP. Alternatively, the controller 101 having the configuration of FIG. 9 may be formed of hardware using a field programmable gate array (FPGA), an application specific integrated circuit (ASIC), or the like.

Figure 10:
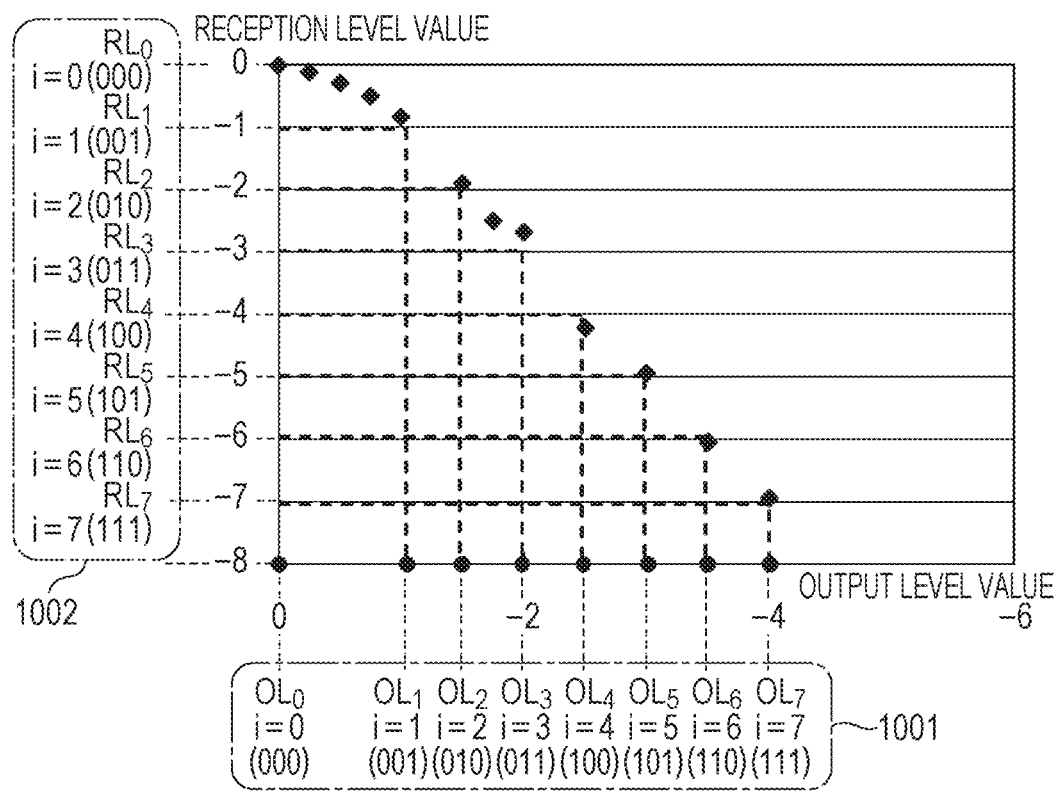
FIG. 10 is a graph for explaining operations of the first embodiment.

FIG. 10 is a graph for explaining operations of the controller 101 according to the first embodiment having the configuration of FIG. 9.

Conventionally, symbols corresponding to the transmission multiple gradation levels i are mapped to the output level values $OL_i$ so that, with respect to the horizontal axis, the output level values $OL_i$ on the transmitter side corresponding to the transmission multiple gradation levels i are at uniform intervals. Here, $0 \leq i \leq N-1$ and N is the number of gradations, and, for example, N=8. In the case of N=8, a symbol sequence that the data conversion & generation unit 901 generates from a digital signal to be transmitted has a 3-bit value from "000" to "111". As a result, when the reception level values on the receiver side on the vertical axis are observed, the intervals between reception level values $RL_i$ corresponding to the reception multiple gradation levels i are uneven.

To address this, the controller 101 according to the first embodiment evenly assigns the reception level values RL with respect to the vertical axis as depicted in FIG. 10. In accordance with the reception multiple gradation levels i, the intervals between the reception level values $RL_i$ outputted by the ADC of the ADC group 110 are made uniform, that is, the distances between symbols (corresponding to the SNRs) are made to be fixed. To realize this, in processing on the transmitter side, the uneven mapping processing unit 910 in the controller 101 maps the transmission multiple gradation levels i of, for example, 3 bits generated by the data conversion & generation unit 901 to the output level values $OL_i$ of 8 bits that are uneven on the horizontal axis as depicted in FIG. 10.

The controller 101 having the configuration of FIG. 9 according to the first embodiment performs this uneven mapping process as calibration processing before the system begins operations. Thus, even when optical devices and electronic devices having various nonlinearities along the communication path from the DAC group 102 to the ADC group 110 are used, it is possible to maintain a fixed distance between symbols (in accordance with the SNR) upon receipt of a signal.

The controller 101 of FIG. 9 according to the first embodiment performs the initialization (optimization) process of optical and electrical components as pre-processing before performing the uneven mapping process described above. The initialization (optimization) process is performed mainly by the LD bias compensation unit 909, the transmission-side amp gain adjustment unit 907, and the reception-side amp gain adjustment unit 908 in the controller 101 in cooperation with one another.

Figure 11A:
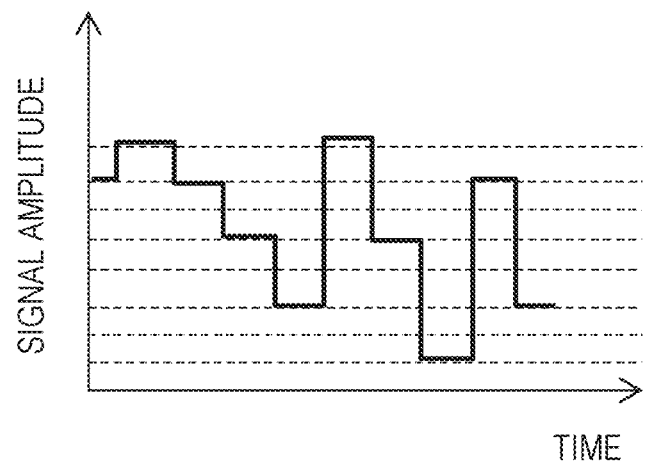
FIG. 11A and FIG. 11B are graphs depicting examples of waveforms of a transmitted modulation signal and a modulation signal received before and after gain adjustment through an initialization (optimization) process of optical and electrical components.
Figure 11B:
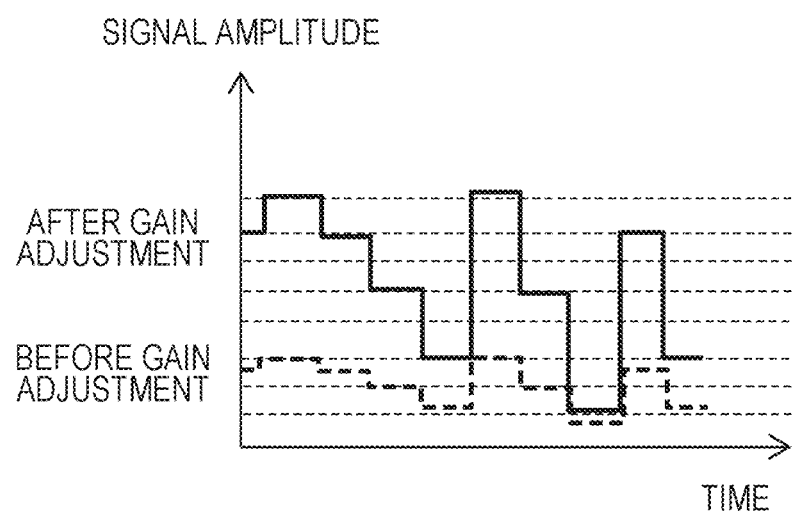

FIG. 11A is a graph depicting an example of waveforms of a transmitted modulation signal, and FIG. 11B is a graph depicting examples of waveforms of a received modulation signal before and after gain adjustment through the initialization (optimization) process of optical and electrical components.

It is preferable that DACs in the DAC group 102 and ADCs in the ADC group 110 operate to the fullest extent possible for the purpose of increasing the SNR in the DACs and the ADCs under the condition where the output voltage range and the input voltage range are basically fixed. In the initialization (optimization) process of optical and electrical components, on the transmitter side, the LD bias adjustment unit 909 and the transmission-side amp gain adjustment unit 907 control the LD bias driver 104 and the modulation-signal driver amplifier 103 of FIG. 1 and FIG. 2, respectively. Additionally, on the receiver side, the reception-side amp gain adjustment unit 908 controls the reception preamplifier 109 of FIG. 1 or FIG. 2. As a result, in the received modulation signal of FIG. 11B, waveforms indicated by a dotted line before gain adjustment are amplitude adjusted to waveforms indicated by a solid line after the gain adjustment, so that the amplitude range of waveforms of this signal is adjusted to that of waveforms of the transmitted modulation signal of FIG. 11A.

Figure 12:
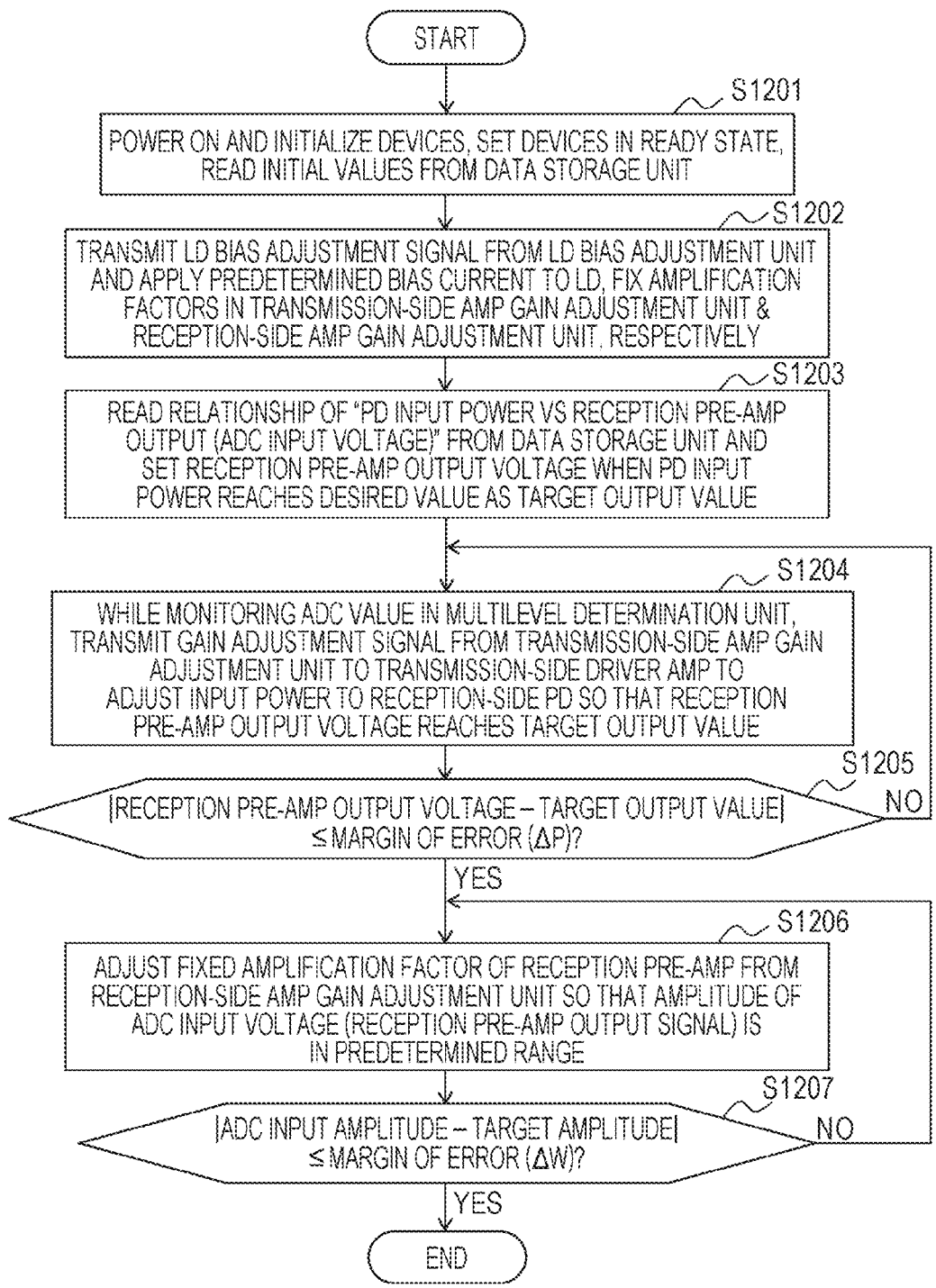
FIG. 12 is a flowchart illustrating an example of the initialization (optimization) process of optical and electrical components.

FIG. 12 is a flowchart illustrating an example of the initialization (optimization) process of optical and electrical components performed by the controller 101 of FIG. 9.

First, the controller 101 is powered on and the controller 101 and the devices illustrated in FIG. 1 or FIG. 2 are initialized to be set to be enabled. Additionally, initial values are read from the data storage unit 911. The initial values are set in the multilevel setting table 902, the multilevel determination table 905, the transmission-side amp gain adjustment unit 907, the reception-side amp gain adjustment unit 908, the LD bias adjustment unit 909, and the uneven mapping processing unit 910 (operation S1201).

Next, the LD bias adjustment unit 909 transmits the LD bias adjustment signal 912 to the LD bias driver 104 of FIG. 1 or FIG. 2. As a result, a predetermined bias current is applied from the LD bias driver 104 to the LD 105 (FIG. 1) or the bias-T 201 (FIG. 2). The transmission-side amp gain adjustment unit 907 and the reception-side amp gain adjustment unit 908 set predetermined amplification factors for the modulation-signal driver amplifier 103 and the reception preamplifier 109 of FIG. 1 or FIG. 2, respectively (operation S1202).

The relationship of "PD input power versus reception preamplifier output (ADC input voltage)" acquired in advance is read from the storage unit 911 into the multilevel determination unit 904, and the reception preamplifier output voltage at the time when the PD input power reaches a desired value is set as a target output value (operation S1203).

In order that the output voltage of the reception preamplifier 109 reaches the target output voltage set at operation S1203 while the multilevel determination unit 904 is monitoring a reception level value outputted by an ADC in the ADC group 110, the following processing performed. The transmission-side amp gain adjustment unit 907 transmits a gain adjustment signal to the modulation-signal driver amplifier 103 to adjust an input light power to the PD 108 on the reception side (operation S1204).

The multilevel determination unit 904 determines whether an absolute value obtained by subtracting the target output value from an output voltage of the reception preamplifier 109 falls within an error range ($\Delta P$) (operation S1205).

If the determination at operation S1205 is no, the multilevel determination unit 904 repeats the processing at operation S1204.

If the determination at operation S1205 is yes, the following operation is performed so that the amplitude of an analog reception electrical signal outputted by the reception preamplifier 109 falls in a predetermined range while the multilevel determination unit 904 is monitoring a reception level value outputted by the ADC in the ADC group 110. The reception-side amp gain adjustment unit 908 adjusts the amplification factor fixed for the reception preamplifier 109 (operation S1206).

The multilevel determination unit 904 determines whether an absolute value obtained by subtracting the target amplitude from an input amplitude of the ADC falls within an error range ($\Delta W$) (operation S1207).

If the determination at operation S1207 is no, the multilevel determination unit 904 repeats the processing at operation S1206.

If the determination at operation S1207 is yes, the controller 101 ends the initialization (optimization) process of optical and electrical components.

By performing the above process, with an analog reception electrical signal inputted from the reception preamplifier 109 to the ADC in the ADC group 110 in FIG. 1 or FIG. 2, it is possible to maintain an optimal range for the input level of the ADC.

Figure 13:
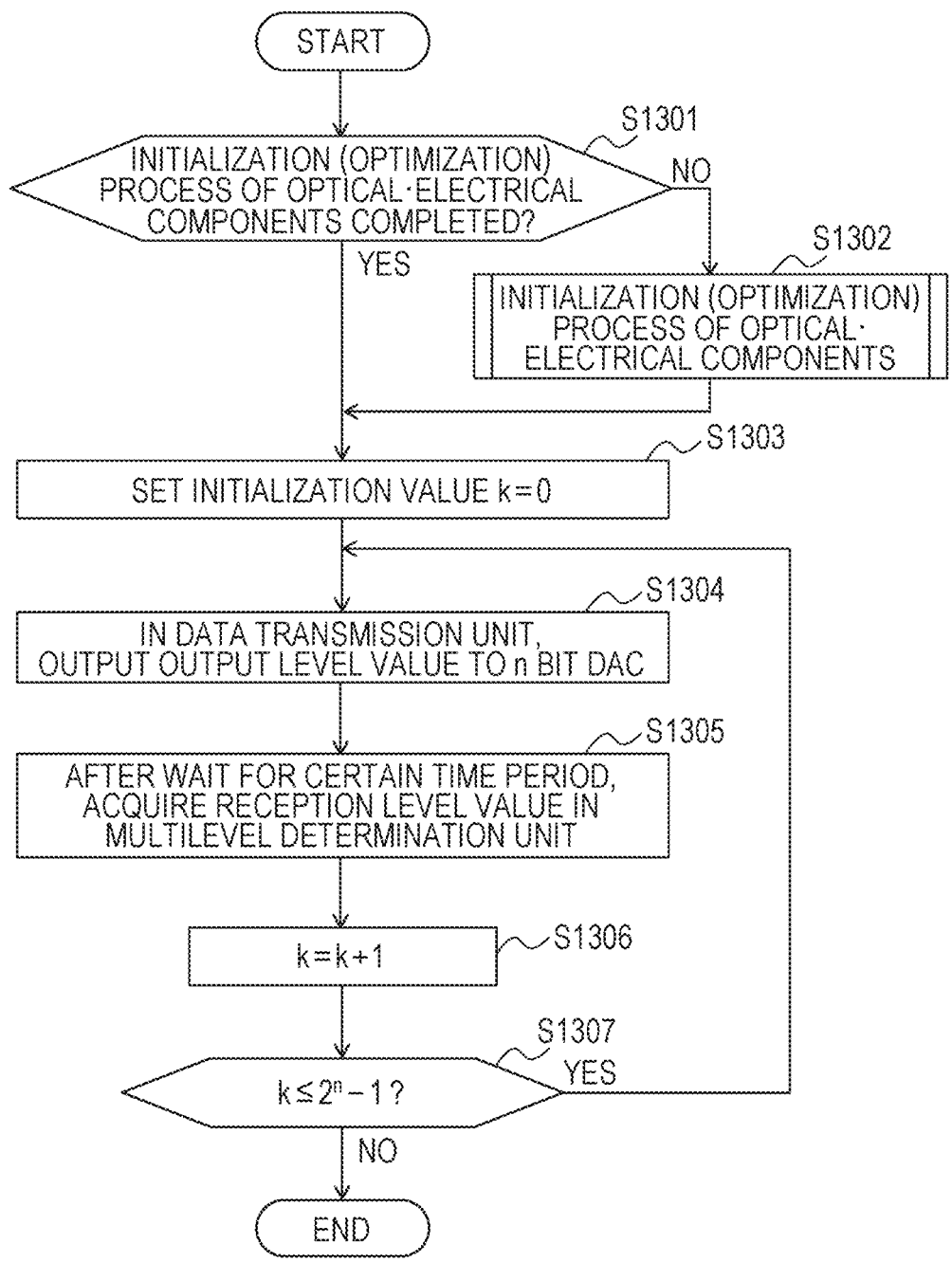
FIG. 13 is a flowchart illustrating an example of a data acquisition sequential process in an uneven mapping process.

FIG. 13 is a flowchart illustrating an example of a data acquisition sequential process in the uneven mapping processing performed by the uneven mapping processing unit 910 of FIG. 9.

In this process, the uneven mapping processing unit 910 sequentially transmits output level values varying in a stepwise manner to the data transmission unit 903. Next, the uneven mapping processing unit 910 causes the multilevel determination unit 904 to measure a reception level value for each of the output level values sequentially outputted to the DAC of the DAC group 102.

First, the uneven mapping processing unit 910 determines whether the initialization (optimization) process of optical and electrical components of FIG. 12 has been completed (operation S1301).

If the this process has not been completed and the determination at operation S1301 is no, the initialization (optimization) process of optical and electrical components of FIG. 12 is performed (operation S1302).

If the determination at operation S1301 is yes or after the processing of operation S1302 is performed, the uneven mapping processing unit 910 initializes a counter variable k for changing an output level value supplied to the DAC on a minimum step (1 digit) basis to 0 (operation S1303).

After that, the uneven mapping processing unit 910 causes the data transmission unit 903 to output an output level value for, for example, an 8-bit binary code of binary data corresponding to k digit to the DAC (operation S1304).

After waiting (standby) for a certain time, the uneven mapping processing unit 910 acquires, through the multilevel determination unit 904, and stores a reception level value corresponding to the above output level value (operation S1305).

The uneven mapping processing unit 910 increments the counter variable k by +1 (operation S1306). Note that if the output level value supplied to the DAC is to be changed on an a digit basis ($1<\alpha$), not on a digit basis, the uneven mapping processing unit 910 increments the counter variable k by $+\alpha$.

The uneven mapping processing unit 910 determines whether the value of the counter variable k is equal to or less than a maximum input value $2^n-1$ of the n-bit DAC (operation S1307). For example, if n=8, the maximum input value is 255.

If the determination at operation S1307 is yes, the uneven mapping processing unit 910 returns to the process of operation S1304, and repeatedly acquires the next k-th output level value and acquires the corresponding reception level value (operation S1305).

If the determination at operation S1307 is no, the uneven mapping processing unit 910 ends the data acquisition sequential process illustrated in the flowchart of FIG. 13.

Figure 14:
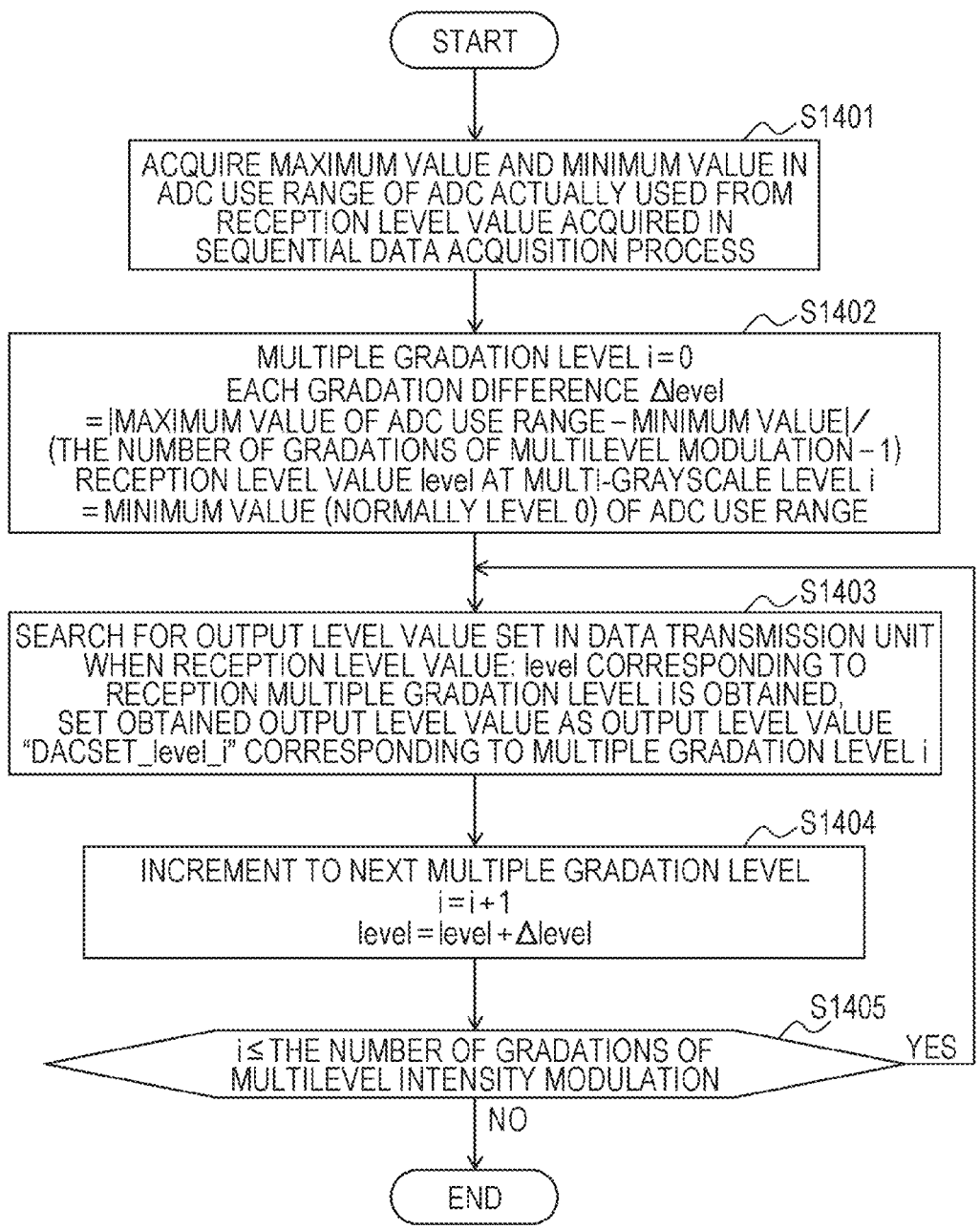
FIG. 14 is a flowchart illustrating an example of a DAC-value search process in the uneven mapping process.

FIG. 14 is a flowchart illustrating an example of a DAC-value search process the uneven mapping processing unit 910 performs after the data acquisition sequential process described above.

The uneven mapping processing unit 910 acquires the maximum value and the minimum value in the usage range of a reception level value outputted by an actually used ADC, from the reception level values acquired in the data acquisition sequential process (operation S1401).

The uneven mapping processing unit 910 sets each initial value. First, the uneven mapping processing unit 910 sets the variable i, which specifies a multiple gradation level, to 0, which is the lowest gradation level. Next, the uneven mapping processing unit 910 calculates each difference between gradations $\Delta$level, which is a uniform interval value of respective reception level values corresponding to multilevel gradation levels (reception multiple gradation level) i, by using the following equation.

Each difference between gradations $\Delta$level=|the maximum value−the minimum value in the ADC usage range|/(the number of gradations of multilevel intensity modulation−1)  (1)

Further, the uneven mapping processing unit 910 sets the reception level value level at the current multiple gradation level (reception multiple gradation level) i to the minimum value (normally level 0) in the ADC usage range corresponding to the current lowest gradation value i=0 (operation S1402).

The uneven mapping processing unit 910 searches for an output level value set in the data transmission unit 903 when the reception level value level corresponding to the current multiple gradation level (reception multiple gradation level) i is obtained by the multilevel determination unit 904. Then, the uneven mapping processing unit 910 sets the obtained output level value as an output level value "DAC-SET_level_i" corresponding to the current multiple gradation level (transmission multiple gradation level) i in the multilevel setting table 902 (operation S1403).

The uneven mapping processing unit 910 performs increment processing for the next multiple gradation level. The uneven mapping processing unit 910 increments the variable i, which indicates the current multiple gradation level, by +1. The uneven mapping processing unit 910 increments the reception level value level corresponding to the current multiple gradation level (reception multiple gradation level) i by each difference between gradations Δlevel, which is uniform (operation S1404).

The uneven mapping processing unit 910 determines whether the current multiple gradation level after the incrementing is equal to or less than the number of gradations in multilevel intensity modulation (operation S1405).

If the determination at operation S1405 is yes, the uneven mapping processing unit 910 returns to the process of operation S1403, and repeats the process of searching for an output level value corresponding to the next multiple gradation level (transmission multiple gradation level) i.

If the determination at operation S1405 is no, the uneven mapping processing unit 910 ends the DAC value search process to complete update of the multilevel setting table 902. From then on, the data transmission unit 903 reads an updated output level value corresponding to a transmission multiple gradation level outputted by the data conversion & generation unit 901 from the multilevel setting table 902, and outputs the updated output level to the DAC.

Note that the uneven mapping processing unit 910 sets a threshold (for example, an intermediate value between adjacent reception level values level) for determining a reception level value level determined for each multiple gradation level (reception multiple gradation level) i in the multilevel determination table 905. From then on, the multilevel determination unit 904 determines a reception multiple gradation level by determining which of the thresholds set in the multilevel determination table 905 are thresholds between which a reception level value outputted by the ADC falls.

The above-described controller 101 according to the first embodiment supposes that noise is present evenly at all the multiple gradation levels, and performs the process of searching for a DAC value when the usage range of the ADC between its maximum value and minimum value is evenly assigned on a bit basis.

FIG. 15 is a table illustrating an example of operations of the above-described process of searching for a DAC value in the case where a DAC and an ADC having 8-bit resolutions are used. It is assumed that the maximum value of the usage range of the ADC is 233, the minimum value is 23, and the number of gradations of multilevel modulation is 8.

In this case, first, each difference between gradations Δlevel is calculated using formula (1) described above as follows.

Each difference between gradations Δlevel=|233−23|/(8−1)=30

That is, 30 digits are each difference between gradations Δlevel. Now, since the minimum value of the usage range of the ADC is 23, the reception level value level for each multiple gradation level (reception multiple gradation level) i is calculated as follows.

level_0=23+(30×0)=23 level_1=23+(30×1)=53 level_2=23+(30×2)=83 level_3=23+(30×3)=113 level_4=23+(30×4)=143 level_5=23+(30×5)=173 level_6=23+(30×6)=203 level_7=23+(30×7)=233

Subsequently, output level values (DACSET_level_i) when the reception level values are obtained are searched for, respectively. From the storage content of output level values versus reception level values obtained by the data acquisition sequential process mentioned above, output level values corresponding to the reception level values mentioned above are searched for, and the following result in a decimal system is assumed to be obtained.

DACSET_level_0=14
DACSET_level_1=24
DACSET_level_2=49
DACSET_level_3=78
DACSET_level_4=110
DACSET_level_5=149
DACSET_level_6=192
DACSET_level_7=238

As seen with the ADC on the receiver side, these are output level values on the transmitter side in which intervals between reception level values corresponding to the multiple gradation levels are even. With the binary data of these output level values, the multilevel setting table 902 is updated. From then on, the data transmission unit 903 uses set values in the multilevel setting table 902 when updating an output level value corresponding to one of the multiple gradation levels. If sufficient accuracy is not obtained after the above process is performed once, control is performed so as to repeat the process a plurality of times, feed the results back, and thus gradually update the multilevel setting table 902.

The foregoing configuration of the controller 101 according to the first embodiment is to compensate for the nonlinearity along the communication path by evenly assigning differences in reception level values level.

Using together with this compensation method or exclusively, it is possible to strictly measure bit error rates (BERs) and signal-to-noise ratios (SNRs) for reception multilevel on the receiver side, and to perform feedback control so that all the BERs or SNRs are within a certain range.

Second Embodiment

Figure 16:
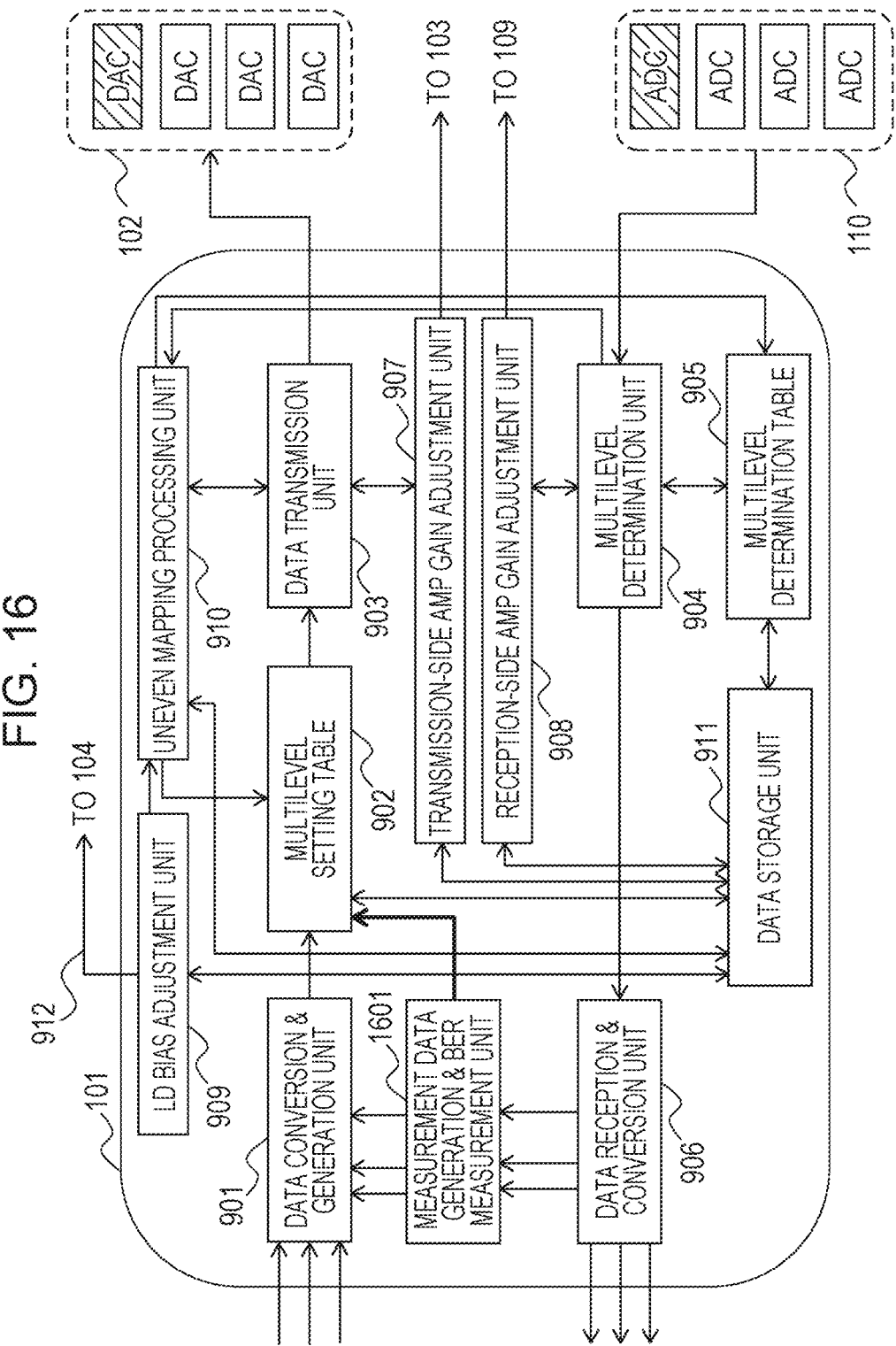
FIG. 16 is a block diagram illustrating an example of a configuration of a controller according to a second embodiment.

FIG. 16 is a block diagram illustrating an example of a configuration of the controller 101 according to a second embodiment, and illustrates the configuration for measuring BERs to compensate for the nonlinearity.

In the configuration of FIG. 16, components that perform the same operations as the components of FIG. 9 are denoted by the same reference numerals. The configuration of FIG. 16 according to the second embodiment differs from the configuration of FIG. 9 according to the first embodiment in that a measurement data generation & BER measurement unit 1601 is added. Note that in the configuration of FIG. 16, the uneven mapping processing unit 910 is included. In this case, for example, at the time of startup of the system or during regular maintenance of the system, a nonlinear compensation process may be performed by the uneven mapping processing unit 910, and, at timings of any time of operations, a nonlinear compensation process may be performed by the measurement data generation & BER measurement unit 1601.

Figure 17:
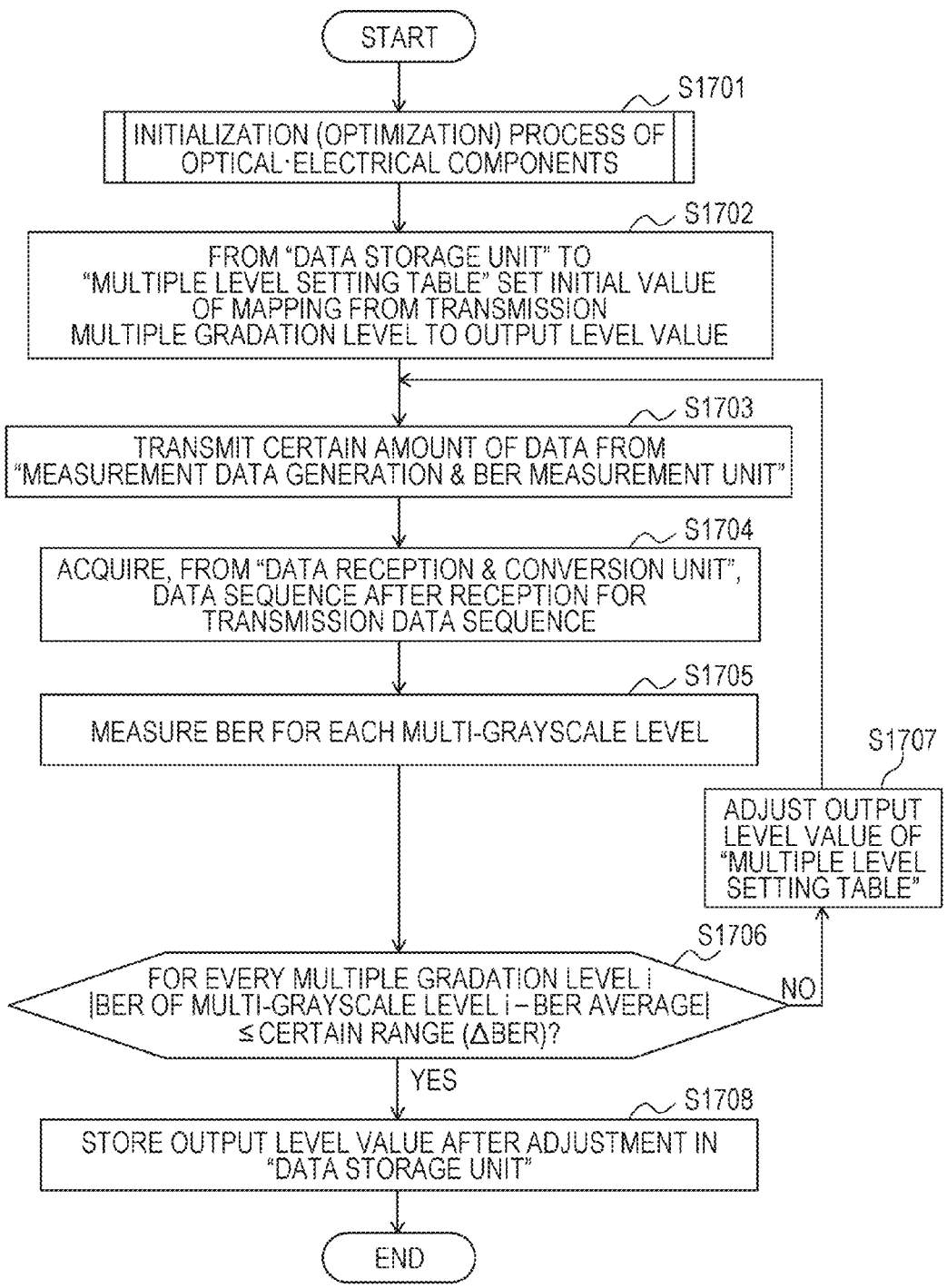
FIG. 17 is a flowchart illustrating an example of a mapping process using BERs.

FIG. 17 is a flowchart illustrating an example of a mapping process using BERs. This process will be described below with reference to the configuration of the controller 101 of FIG. 16.

First, the controller 101 performs the initialization (optimization) process of optical and electrical components illustrated in the flowchart of FIG. 12 (operation S1701).

After that, from the data storage unit 911 to the multilevel setting table 902, the initial values of mapping from transmission multiple gradation levels to output level values are set (operation 1702).

The measurement data generation & BER measurement unit 1601 transmits a certain amount of data through the data conversion & generation unit 901 (operation S1703).

The measurement data generation & BER measurement unit 1601 acquires a data sequence received by the data reception & conversion unit (data reception unit) 906 for a transmission data sequence at operation S1703 (operation S1704).

The measurement data generation & BER measurement unit 1601 measures a BER for each multiple gradation level (reception multiple gradation level) based on the reception data sequence acquired at operation S1704 (operation S1705).

The measurement data generation & BER measurement unit 1601 determines for every multiple gradation level i whether the absolute value of a difference between the BER of the multiple gradation level i and the average value of BERs of all the multiple gradation levels i falls within a certain range (ABER) (operation S1706).

If the determination at operation S1706 is no, the measurement data generation & BER measurement unit 1601 adjusts the output level value for each transmission multiple gradation level in the multilevel setting table 902 (operation S1707). For example, the output level value for each transmission multiple gradation level is increased or decreased by a certain amount in a predetermined order. After that, the measurement data generation & BER measurement unit 1601 returns to the process of operation S1703, where measurement and determination of BERs are repeated.

Once the determination at operation S1706 is yes, the measurement data generation & BER measurement unit 1601 saves, in the data storage unit 911, the output level value after adjustment in the multilevel setting table 902 (operation S1708). After that, the measurement data generation & BER measurement unit 1601 ends the mapping process using BERs illustrated in the flowchart of FIG. 17.

Third Embodiment

Figure 18:
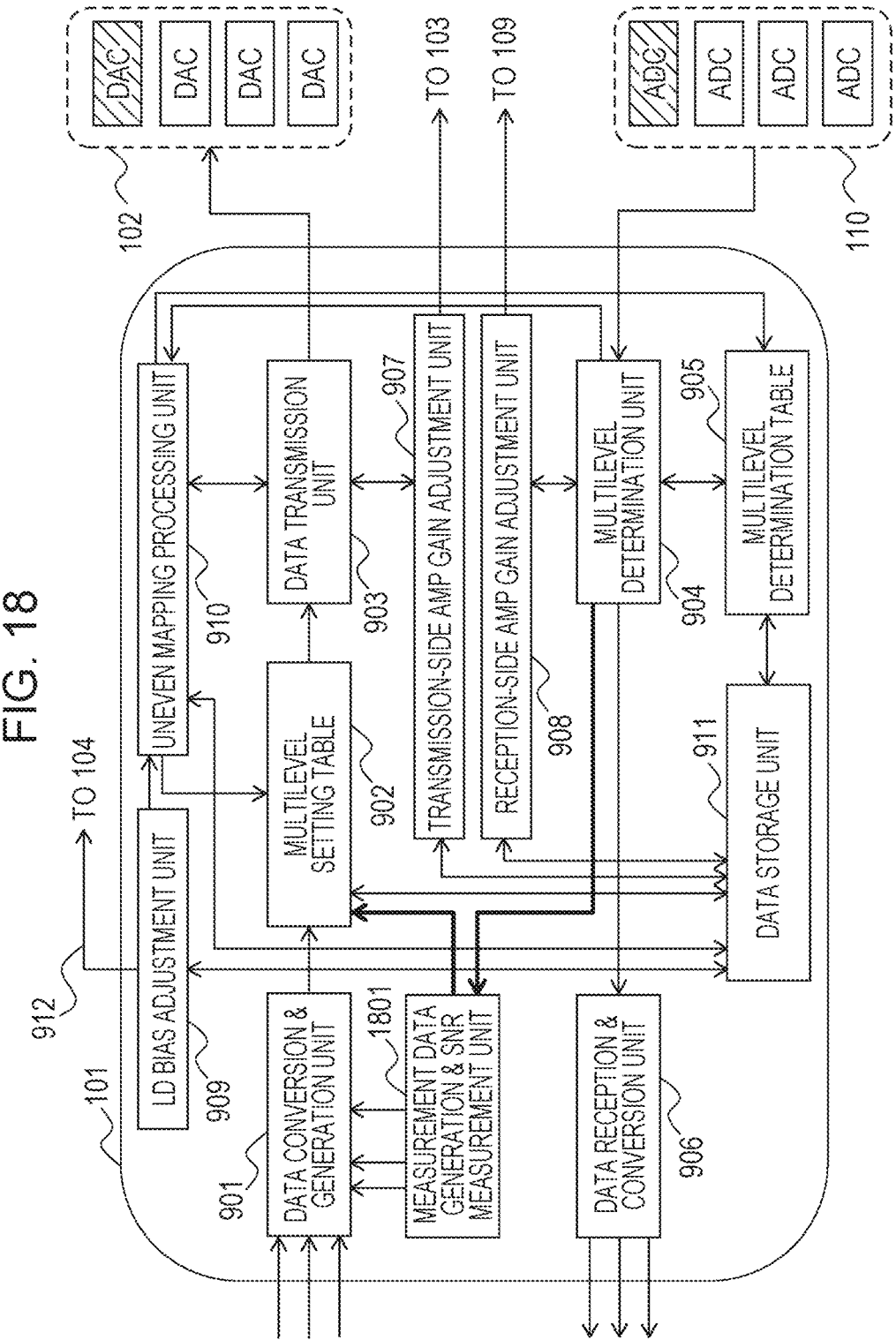
FIG. 18 is a block diagram illustrating an example of a configuration of a controller according to a third embodiment.

FIG. 18 is a block diagram illustrating an example of a configuration of the controller 101 according to a third embodiment, and illustrates the configuration for measuring SNRs to compensate for the nonlinearity.

In the configuration of FIG. 18, components that perform the same operations as the components of FIG. 9 are denoted by the same reference numerals. The configuration of FIG. 18 according to the third embodiment differs from the configuration of FIG. 9 according to the first embodiment in that a measurement data generation & SNR measurement unit 1801 is added. Note that in the configuration of FIG. 18, the uneven mapping processing unit 910 is included. In this case, for example, at the time of startup of the system or during regular maintenance of the system, a nonlinear compensation process may be performed by the uneven mapping processing unit 910, and, at timings of any time of operations, a nonlinear compensation process may be performed by the measurement data generation & SNR measurement unit 1801.

Figure 19:
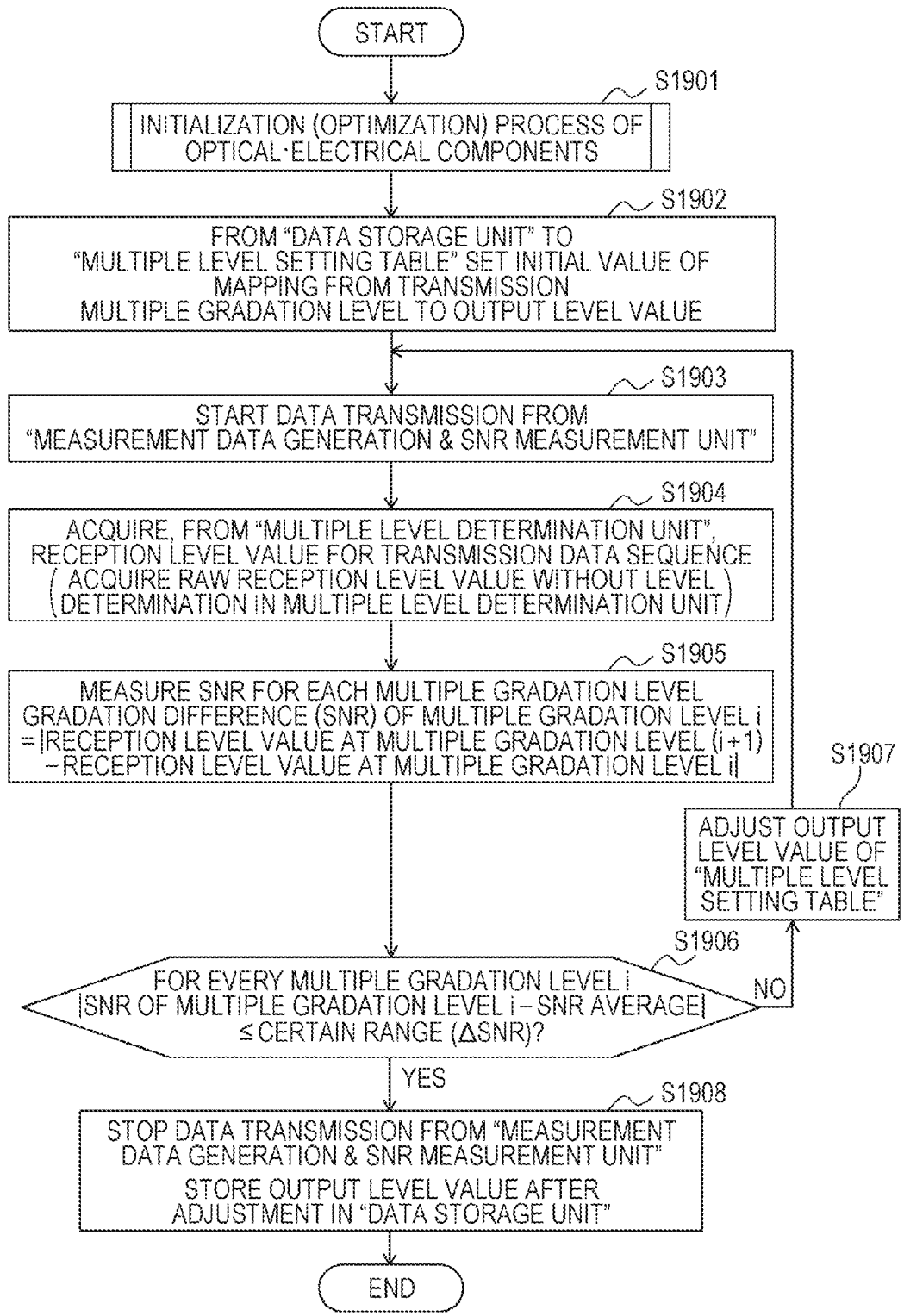
FIG. 19 is a flowchart illustrating an example of a mapping process using SNRs.

FIG. 19 is a flowchart illustrating an example of a mapping process using SNRs. This process will be described below with reference to the configuration of the controller 101 of FIG. 18.

First, the controller 101 performs the initialization (optimization) process of optical and electrical components illustrated in the flowchart of FIG. 12 (operation S1901).

After that, from the data storage unit 911 to the multilevel setting table 902, the initial values of mapping from transmission multiple gradation levels to output level values are set (operation 1902).

The measurement data generation & SNR measurement unit 1801 starts data transmission through the data conversion & generation unit 901 (operation S1903).

The measurement data generation & SNR measurement unit 1801 acquires a reception level value for a transmission data sequence at operation S1903 from the multilevel determination unit 904 (operation S1904). Note that, unlike the case of the first embodiment, the multilevel determination unit 904 does not make a determination of each reception multiple gradation level, and acquires a raw reception level value.

The measurement data generation & SNR measurement unit 1801 measures an SNR for each multiple gradation level (reception multiple gradation level) by using the following formula based on the reception level value level acquired at operation S1904 (operation S1905).

Difference between gradations (SNR) at the multiple gradation level $i$=|reception level value at multiple gradation level $i$+1−reception level value at multiple gradation level $i$|     (2)

The measurement data generation & SNR measurement unit 1801 determines for every multiple gradation level i whether the absolute value of a difference between the SNR of the multiple gradation level i and the average value of SNRs of all the multiple gradation levels i falls within a certain range (ΔSNR) (operation S1906).

If the determination at operation S1906 is no, the measurement data generation & SNR measurement unit 1801 adjusts the output level value for each transmission multiple gradation level in the multilevel setting table 902 (operation S1907). For example, the output level value for each transmission multiple gradation level is increased or decreased by a certain amount in a predetermined order. After that, the measurement data generation & SNR measurement unit 1801 returns to the process of operation S1903, where measurement and determination of SNRs are repeated.

Once the determination at operation S1906 is yes, the measurement data generation & SNR measurement unit 1801 stops data transmission. Then, the measurement data generation & SNR measurement unit 1801 saves, in the data storage unit 911, the output level value after adjustment in the multilevel setting table 902 (operation S1908). After that, the measurement data generation & SNR measurement unit 1801 ends the mapping process using SNRs illustrated in the flowchart of FIG. 19.

FIG. 20 is a table illustrating an example of operations of the mapping process using SNRs. The intervals between reception levels corresponding to multiple gradation levels are set so that the difference in the reception level of each multiple gradation level (reception multiple gradation level) after reception is fixed among the multiple gradation levels.

That is, for the current multiple gradation level i (for example, in the case of 8 gradations, i is any of 0 to 7), the difference between gradations (SNR) is calculated according to formula (2) described above as illustrated in FIG. 20.

Then, the output level value "DACSET_level _i" is set so that the differences of all the multiple gradation levels are equal.

With the configuration of the controller 101 according to the second and third embodiments described above, the nonlinearity may be compensated for by using the uneven mapping process at the time of startup of the system, or the like, and the nonlinearity may be compensated for by using the mapping process using BERs or SNRs during operation of the system.

Although not illustrated in FIG. 9, FIG. 16, and FIG. 18, the controller 101 may be configured as a function of performing signal processing of four channels in parallel so as to correspond to DACs of four channels in the DAC group 102 and ADCs of four channels in the ADC group 110.

The controller 101 according to the first to third embodiments described above makes it possible to realize a multilevel intensity modulation and demodulation system with high reliability with which the nonlinearity at an intermediate output level due to various devices in the system may be compensated for.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A multilevel intensity modulation and demodulation system comprising:
    a digital-to-analog conversion unit configured to convert an output level value of a digital signal to be transmitted into an analog transmission electrical signal;
    a multilevel intensity-modulated light transmission unit configured to transmit, to an optical transmission system, an optical signal that is multilevel intensity modulated based on the analog transmission electrical signal;
    a multilevel intensity-modulated light reception unit configured to receive, from the optical transmission system, the optical signal that is multilevel intensity modulated, and convert the received optical signal into an analog reception electrical signal;
    an analog-to-digital conversion unit configured to convert the analog reception electrical signal into a reception level value; and
    a controller configured to convert a transmission multiple gradation level, the transmission multiple gradation level being one of a plurality of multiple gradation levels of multilevel intensity modulation to which the digital signal to be transmitted is mapped, into the output level value so as to cause the reception level value to be in a desired reception state, and to receive a digital signal corresponding to a reception multiple gradation level determined from the reception level value.

2. The multilevel intensity modulation and demodulation system according to claim 1, wherein the controller includes:
    a data conversion unit configured to convert, into the transmission multiple gradation level, the digital signal to be transmitted;
    a multilevel setting unit configured to set an output level value for each of the plurality of multiple gradation levels;
    a data transmission unit configured to generate an output level value corresponding to the transmission multiple gradation level by referring the multilevel setting unit;
    a multilevel determination unit configured to determine which of the plurality of multiple gradation levels the reception level value corresponds to so as to generate a reception multiple gradation level;
    a data reception unit configured to receive a digital signal corresponding to the reception multiple gradation level; and
    an output level value update unit configured to update the output level value for each of the plurality of multiple gradation levels set by the multilevel setting unit so as to cause the reception level value to be in a desired reception state.

3. The multilevel intensity modulation and demodulation system according to claim 2, wherein the output level value update unit updates the output level value for each of the plurality of multiple gradation levels set by the multilevel setting unit so as to achieve a uniform interval of the reception level value between adjacent symbols of the reception multiple gradation level.

4. The multilevel intensity modulation and demodulation system according to claim 3, wherein the output level value update unit performs, by a processor,
    a data acquisition sequential process that causes the data transmission unit to sequentially transmit the output level values varying in a stepwise manner and causes the analog-to-digital conversion unit to measure the reception level value for each of the output level values sequentially transmitted, and
    an output level value search process in which a reception level value for each of the plurality of multiple gradation levels is obtained by evenly dividing a range between a maximum value and a minimum value of the reception level values outputted by the analog-to-digital conversion unit through the data acquisition sequential process, based on a number of gradations of the plurality of multiple gradation levels, the output level value upon output of the reception level value for each of the plurality of multiple gradation levels in the data acquisition sequential process is searched for, and the output level value for each of the plurality of multiple gradation levels set by the multilevel setting unit is updated by the outlet level value searched for.

5. The multilevel intensity modulation and demodulation system according to claim 2, wherein the output level value update unit updates the output level value for each of the plurality of multiple gradation levels set by the multilevel setting unit so as to cause bit error rates to be equal among the plurality of multiple gradation levels of digital signals received by the data reception unit.

6. The multilevel intensity modulation and demodulation system according to claim 2, wherein the output level value update unit updates the output level value for each of the plurality of multiple gradation levels set by the multilevel setting unit so as to cause signal-to-noise ratios to be equal among the plurality of multiple gradation levels of reception level values received by the analog-to digital conversion unit.

7. The multilevel intensity modulation and demodulation system according to claim 1, wherein the multilevel intensity-modulated light transmission unit includes a light source and an optical modulator configured to provide light intensity modulation on light from the light source so as to generate the optical signal.

8. The multilevel intensity modulation and demodulation system according to claim 7, wherein the multilevel intensity-modulated light transmission unit further includes a driving circuit configured to convert the analog transmission electrical signal into a control signal to the optical modulator.

9. The multilevel intensity modulation and demodulation system according to claim 1, wherein the multilevel intensity-modulated light transmission unit includes a direct modulation light source configured to generate the optical signal that is light intensity modulated based on the analog transmission electrical signal.

10. The multilevel intensity modulation and demodulation system according to claim 9, wherein the multilevel intensity-modulated light transmission unit further includes a driving circuit configured to convert the analog transmission electrical signal into a control signal to the direct modulation light source.

11. The multilevel intensity modulation and demodulation system according to claim 1, wherein the controller further includes an adjustment unit configured to control any one or more of a gain of the analog transmission electrical signal outputted from the digital-to-analog conversion unit, a gain of the analog reception electrical signal outputted from the multilevel intensity-modulated light reception unit, and a bias value of a light source in the multilevel intensity-modulated light transmission unit.

12. A multilevel intensity modulation and demodulation method comprising:
    converting an output level value of a digital signal to be transmitted into an analog transmission electrical signal;
    transmitting, to an optical transmission system, an optical signal that is multilevel intensity modulated based on the analog transmission electrical signal;
    receiving, from the optical transmission system, the optical signal that is multilevel intensity modulated converting the received optical signal into an analog reception electrical signal;
    converting the analog reception electrical signal into a reception level value;
    converting a transmission multiple gradation level, the transmission multiple gradation level being one of a plurality of multiple gradation levels of multilevel intensity modulation to which the digital signal to be transmitted is mapped, into the output level value so as to cause the reception level value to be in a desired reception state; and
    receiving a digital signal corresponding to a reception multiple gradation level determined from the reception level value.

* * * * *